(12) United States Patent
Kim et al.

(10) Patent No.: US 12,447,825 B2
(45) Date of Patent: Oct. 21, 2025

(54) BATTERY SERVICE PROVIDING SYSTEM AND METHOD

(71) Applicant: LG ENERGY SOLUTION, LTD., Seoul (KR)

(72) Inventors: Hyun Kim, Daejeon (KR);
Dong-Myung Kim, Daejeon (KR);
Jin-Suk Kim, Daejeon (KR);
Hyung-Sik Kim, Daejeon (KR);
Hyoung Jun Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 294 days.

(21) Appl. No.: 17/921,258

(22) PCT Filed: Jun. 2, 2021

(86) PCT No.: PCT/KR2021/006896
§ 371 (c)(1),
(2) Date: Oct. 25, 2022

(87) PCT Pub. No.: WO2021/246788
PCT Pub. Date: Sep. 12, 2021

(65) Prior Publication Data
US 2023/0182575 A1 Jun. 15, 2023

(30) Foreign Application Priority Data
Jun. 2, 2020 (KR) .................. 10-2020-0066164

(51) Int. Cl.
*B60L 3/00* (2019.01)
*B60L 58/16* (2019.01)
(Continued)

(52) U.S. Cl.
CPC ............. *B60L 3/0046* (2013.01); *B60L 58/16* (2019.02); *G01R 31/367* (2019.01);
(Continued)

(58) Field of Classification Search
CPC ...... B60L 3/0046; B60L 58/16; B60L 53/665; B60L 53/68; B60L 58/12; B60L 53/305;
(Continued)

(56) References Cited

U.S. PATENT DOCUMENTS

| | | |
|---|---|---|
| 2003/0231006 A1 | 12/2003 | Tojima |
| 2010/0045240 A1 | 2/2010 | Bergveld et al. |

(Continued)

FOREIGN PATENT DOCUMENTS

| | | |
|---|---|---|
| CN | 102183730 A | 9/2011 |
| CN | 102959418 A | 3/2013 |

(Continued)

OTHER PUBLICATIONS

International Search Report for PCT/KR2021/006896 (PCT/ISA/210) mailed on Sep. 23, 2021.

(Continued)

*Primary Examiner* — Thomas Ingram
(74) *Attorney, Agent, or Firm* — Lerner David LLP

(57) ABSTRACT

A battery service providing system and method, the battery service providing system including a battery service server for collecting diagnostic analysis data including operation characteristic information of a battery and driving characteristic information of an electric vehicle from an electric vehicle control device and providing update information of a charging/discharging control logic of the battery according to the degree of degradation determined from the diagnostic analysis data to the electric vehicle control device, determining a residual value or a usage fee of the battery based on the determined degree of degradation, transmitting the usage fee or the residual value of the battery to an external server, or setting a warranty flag for the battery whose (Continued)

charging and discharging is controlled according to the update information of the charging/discharging control logic.

19 Claims, 7 Drawing Sheets

(51) Int. Cl.
  *G01R 31/367* (2019.01)
  *G01R 31/392* (2019.01)
  *G06Q 30/012* (2023.01)
  *G06Q 30/0207* (2023.01)
(52) U.S. Cl.
  CPC ......... *G01R 31/392* (2019.01); *G06Q 30/012* (2013.01); *G06Q 30/0213* (2013.01)
(58) Field of Classification Search
  CPC .. G01R 31/367; G01R 31/392; G06Q 30/012; G06Q 30/0213; G06Q 10/063; G06Q 10/20; G06Q 30/0278; G06Q 40/08; G06Q 50/40; G06Q 30/0266; G06Q 30/0645; Y02T 10/70; B60Y 2200/91; Y04S 30/14
  See application file for complete search history.

(56) References Cited

U.S. PATENT DOCUMENTS

| | | | |
|---|---|---|---|
| 2011/0050239 A1 | 3/2011 | Hoshino | |
| 2011/0258126 A1 | 10/2011 | Patil et al. | |
| 2013/0085696 A1* | 4/2013 | Xu | B60L 58/16 702/63 |
| 2014/0103934 A1 | 4/2014 | Matsui et al. | |
| 2014/0232356 A1* | 8/2014 | Kyoung | B60L 58/16 320/162 |
| 2015/0369874 A1 | 12/2015 | Park et al. | |
| 2017/0023649 A1* | 1/2017 | You | G01R 31/367 |
| 2018/0009330 A1 | 1/2018 | Ricci | |
| 2018/0172777 A1 | 6/2018 | Park et al. | |
| 2019/0111800 A1 | 4/2019 | Remboski et al. | |
| 2019/0176639 A1 | 6/2019 | Kumar et al. | |
| 2019/0329669 A1 | 10/2019 | Soeda et al. | |
| 2020/0284846 A1* | 9/2020 | Pajovic | G01R 31/396 |
| 2020/0326381 A1 | 10/2020 | Matsumura et al. | |
| 2020/0386819 A1* | 12/2020 | Lee | G01R 31/382 |
| 2020/0408846 A1* | 12/2020 | Bae | B60L 3/12 |
| 2021/0190878 A1 | 6/2021 | Lee et al. | |
| 2021/0239765 A1* | 8/2021 | Katori | G01R 31/386 |
| 2021/0291698 A1 | 9/2021 | Nishida | |
| 2021/0323419 A1 | 10/2021 | Maruno et al. | |
| 2022/0242274 A1 | 8/2022 | Soeda et al. | |
| 2023/0103122 A1* | 3/2023 | Tsuda | G01R 31/392 701/32.1 |
| 2024/0042894 A1 | 2/2024 | Soeda et al. | |

FOREIGN PATENT DOCUMENTS

| | | | |
|---|---|---|---|
| CN | 106004477 | A | 10/2016 |
| CN | 106371021 | A | 2/2017 |
| JP | 2004-022183 | A | 1/2004 |
| JP | 2006-73019 | A | 3/2006 |
| JP | 2010518390 | A | 5/2010 |
| JP | 2013516614 | A | 5/2013 |
| JP | 2014167450 | A | 9/2014 |
| JP | 2019192630 | A | 10/2019 |
| KR | 20090078448 | A | 7/2009 |
| KR | 10-2010-0038787 | A | 4/2010 |
| KR | 20100038787 | A | 4/2010 |
| KR | 10-1154525 | B1 | 6/2012 |
| KR | 10-2013-0082959 | A | 7/2013 |
| KR | 10-2014-0105060 | A | 9/2014 |
| KR | 2014-0105060 | A | 9/2014 |
| KR | 10-2016-0000317 | A | 1/2016 |
| KR | 10-2017-0011010 | A | 2/2017 |
| KR | 2017-0011010 | A | 2/2017 |
| KR | 20180069438 | A | 6/2018 |
| KR | 20190036115 | A | 4/2019 |
| KR | 10-2019-0108754 | A | 9/2019 |
| KR | 10-2046995 | B1 | 12/2019 |
| KR | 20200030467 | A | 3/2020 |
| KR | 10-2120718 | B1 | 6/2020 |
| WO | 2019131824 | A1 | 7/2019 |
| WO | 2020036984 | A1 | 2/2020 |
| WO | 2020044713 | A1 | 3/2020 |
| WO | 2020044719 | A1 | 3/2020 |

OTHER PUBLICATIONS

Hoog, J. D. et al., "A combined thermo-electric resistance degradation model for nickel manganese cobalt oxide based lithium-ion cells", Applied Thermal Engineering, Feb. 2018, pp. 54-65, vol. 135.
Extended European Search Report including Written Opinion for Application No. 24189312.2 dated Oct. 21, 2024, pp. 1-11.
Li, Y. et al., "Data-driven health estimation and lifetime prediction of lithium-ion batteries: A review" Renewable and Sustainable Energy Reviews, Elsevier, Jul. 2019, pp. 1-18, vol. 113.
Extended European Search Report including Written Opinion for Application No. 21818347.3 dated May 15, 2023, pp. 1-12.
Extended European Search Report including Written Opinion for Application No. 24189339.5 dated Oct. 31, 2024, pp. 1-13.
Search Report dated Dec. 30, 2024 from the Office Action for Chinese Application No. 202180006758.4 issued Dec. 31, 2024. 3 pages.

* cited by examiner

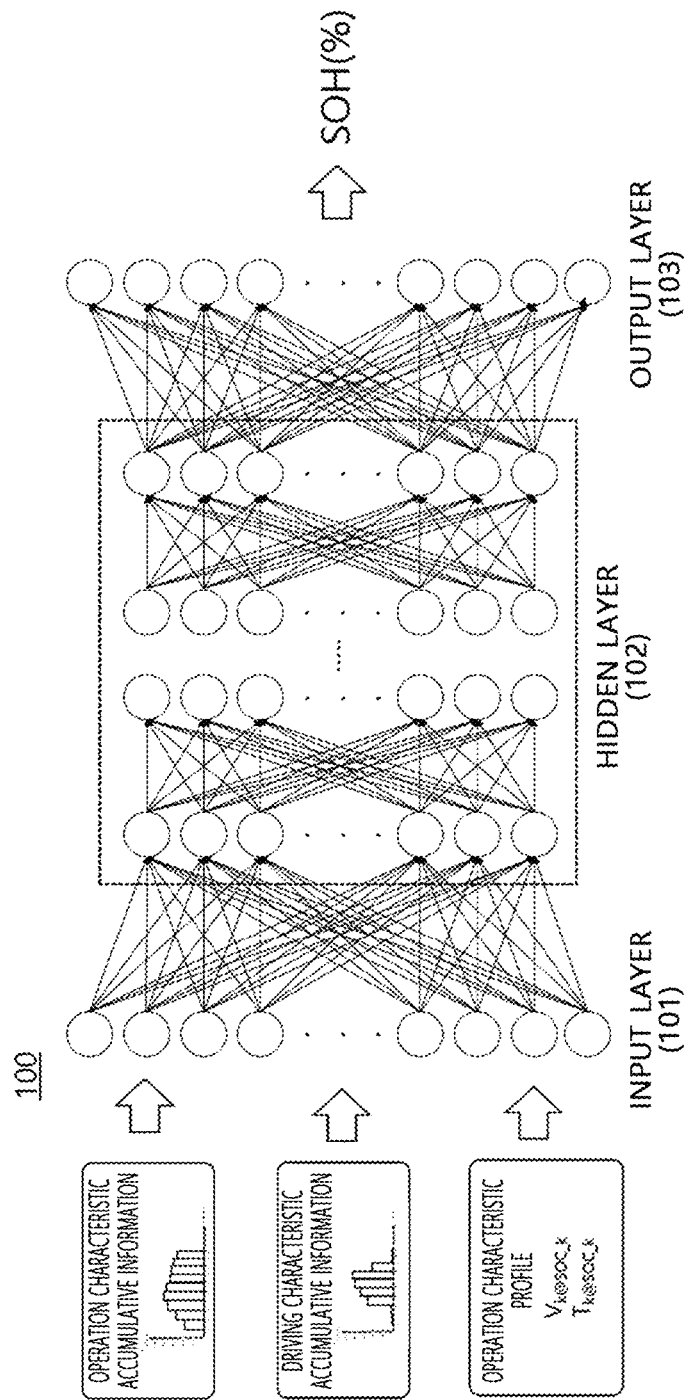

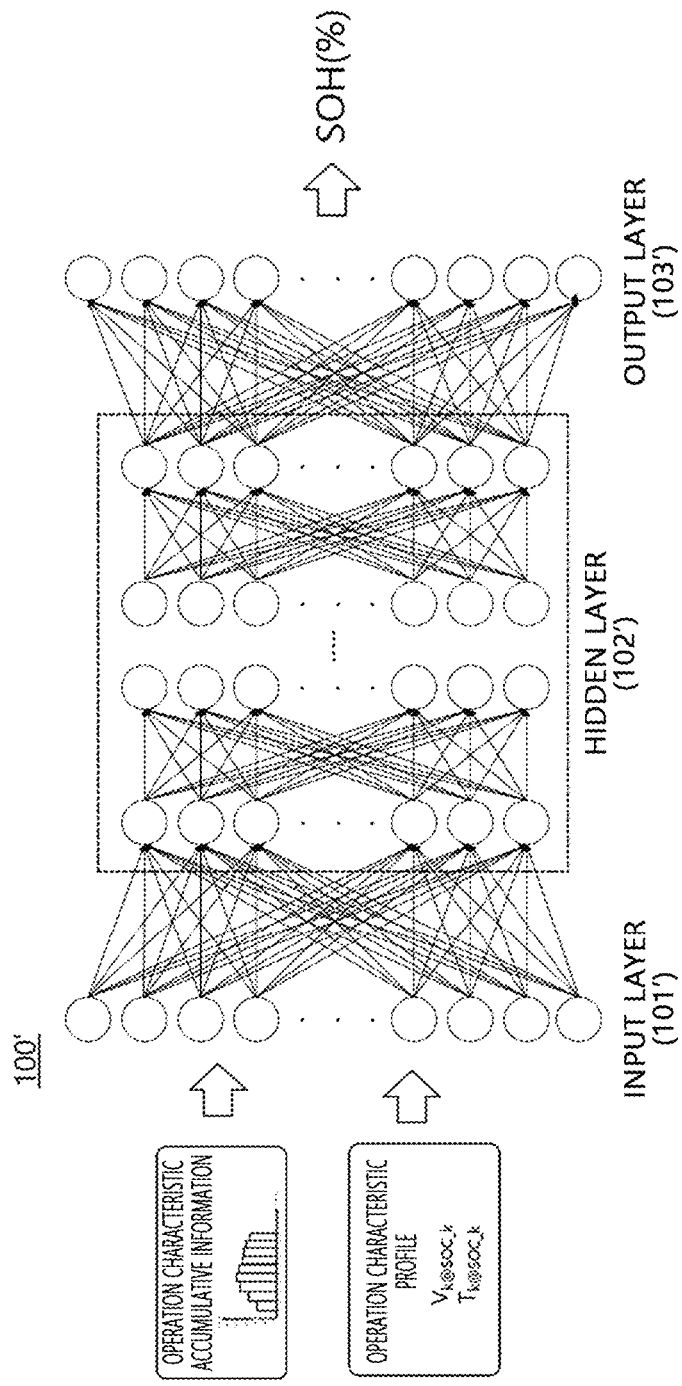

BATTERY SERVICE PROVIDING SYSTEM AND METHOD

TECHNICAL FIELD

The present application claims priority to Korean Patent Application No. 10-2020-0066164 filed on Jun. 2, 2020 in the Republic of Korea, the disclosures of which are incorporated herein by reference.

The present disclosure relates to a battery service providing system and method, and more particularly, to a system and method in which a remote server collects data about operation information of a battery mounted to an electric vehicle and various service about the battery may be provided based on the collected big data.

BACKGROUND ART

The use of batteries is rapidly spreading not only to mobile devices such as cell phones, laptop computers, smart phones and smart pads, but also to electric vehicles (EV, HEV, PHEV) and large-capacity energy storage systems (ESS).

A battery mounted to an electric vehicle includes a plurality of battery cell assemblies connected in series and/or in parallel to secure high energy capacity and high output.

The battery cell may include one unit cell or a plurality of unit cells connected in series and/or in parallel. The unit cell means one independent cell that has a negative terminal and a positive terminal and is physically separable. For example, one pouch-type lithium polymer cell may be regarded as a unit cell.

In case of a battery of an electric vehicle, the speed of performance degradation changes depending on driving habits of a driver or driving environments. For example, if the electric vehicle is used with frequent rapid acceleration or operated in a mountainous area, a desert area or a cold area, the battery of the electric vehicle has a relatively fast degradation speed since it is used under a severe condition.

The degree of degradation of battery performance may be quantified as a factor called SOH (State Of Health). The SOH is a numerical value indicating the performance of a battery in a MOL (Middle Of Life) state as a relative ratio based on the performance of the battery in a BOL (Beginning Of Life) state.

As indicators representing battery performance, capacity and internal resistance of the battery are used. As the charging/discharging cycle of the battery increases, the capacity of the battery decreases and the internal resistance increases. Therefore, the SOH may be quantified by the rate of decrease in capacity of the battery or the rate of increase in internal resistance of the battery.

The degree of degradation of a battery is inversely proportional to the magnitude of SOH. That is, the SOH of the battery in a BOL state is expressed as 100%, and the SOH of the battery in a MOL state is expressed as a percentage lower than 100% as the degradation of the battery increases. If the SOH is lowered below a certain level to reach an EOL (End Of Life), the performance of the battery has degraded beyond the limit, so the battery needs to be replaced.

The charging/discharging control logic of the battery must be set differently according to the degradation of the performance to delay the degradation speed of the battery as much as possible and thus extend the service life. To this end, there is a need for a method to monitor performance changes for a plurality of batteries belonging to the same model in a centralized manner and to efficiently update various control logics used for charging and discharging electric vehicles.

Meanwhile, since the core part of an electric vehicle is a battery, maintenance of the battery is most important. Since a battery is an electrochemical device, it is necessary to accurately diagnose the current state and perform management accordingly. In addition, economical operation is possible only when the user of the electric vehicle accurately knows the state of the battery. For example, if the SOH of the battery is low, it is desirable to delay the degradation of the battery life through economical operation.

Electric vehicles are more expensive than vehicles that run on fossil fuels. This is because of the price of batteries mounted in the electric vehicles. Therefore, for the proliferation of electric vehicles, the government provides a subsidy program to support a portion of the electric vehicle price. However, in order to popularize electric vehicles, it is necessary to further reduce the burden of purchasing electric vehicles through battery rental services or the like.

In addition, it is necessary to calculate the residual value of the electric vehicle when the user of the electric vehicle purchases car insurance or wants to make a transaction for a used electric vehicle. It is reasonable to evaluate the residual value of the electric vehicle differently depending on the state of the battery. Since the battery residual value depends on the charging/discharging history so far, a method to reasonably determine the battery residual value is needed.

DISCLOSURE

Technical Problem

The present disclosure is designed to solve the problems of the related art, and therefore the present disclosure is directed to providing a big data-based battery service providing system and method, which may collect data representing the operation characteristic of a battery mounted to an electric vehicle in a centralized way from an electric vehicle control device mounted to the electric vehicle, and diagnose the performance (e.g., the degree of degradation) of the battery based on the collected data, and provide various additional services related to the battery according to the diagnosed performance.

Technical Solution

In one aspect of the present disclosure, there is provided a battery service providing system, comprising: an electric vehicle control device configured to collect and manage operation characteristic information of a battery mounted to an electric vehicle and driving characteristic information of the electric vehicle; a battery service server communicatively connected to the electric vehicle control device through a network; and a database connected to the battery service server so as to be accessed by the battery service server.

Preferably, the battery service server may be configured to: collect diagnostic analysis data including the operation characteristic information of the battery and the driving characteristic information of the electric vehicle from the electric vehicle control device through the network and store the diagnostic analysis data in the database; and determine a degree of degradation of the battery from the diagnostic analysis data.

Preferably, the battery service server may be configured to: (a) generate update information of a charging/discharging control logic of the battery according to the determined degree of degradation and provide the update information to the electric vehicle control device, (b) determine a residual value of the battery based on the determined degree of degradation, (c) determine a usage fee of the battery based on the determined degree of degradation, (d) transmit the usage fee or the residual value of the battery to an external server according to a request of the external server, or (e) set a warranty flag for the battery whose charging and discharging is controlled according to the update information of the charging/discharging control logic.

According to an embodiment, the battery service server may be configured to collect identification information including at least one selected from an electric vehicle model code, an electric vehicle identification code, a battery model code and a battery identification code from the electric vehicle control device through the network and store the diagnostic analysis data in the database to be matched with the identification information.

In another embodiment, the database may include a data area in which voltage profile information defined for each battery model and each degree of degradation is stored, and the battery service server may be configured to identify a voltage profile with highest similarity to a voltage profile included in the diagnostic analysis data by referring to the voltage profile information of each degree of degradation corresponding to a battery model for which the diagnostic analysis data is collected, determine a degree of degradation corresponding to the identified voltage profile as a degree of degradation of the battery, and store the determined degree of degradation in the database.

Preferably, the update information of the charging/discharging control logic may include at least one selected from a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map of each SOC, and an internal resistance map of each SOC.

As another example, the update information of the charging/discharging control logic may include at least one selected from an upper limit of a pulse current duty ratio, a lower limit of the pulse current duty ratio, an upper limit of a pulse current duration, a lower limit of the pulse current duration, a maximum value of pulse current, and a minimum value of the pulse current, in the case where the battery is pulse-charged/discharged.

As still another example, the update information of the charging/discharging control logic may include a charging current magnitude applied for each SOC section, in the case where the battery is step-charged.

As still another example, the update information of the charging/discharging control logic may include at least one selected from a current magnitude in a constant-current charging (CC) mode, a cutoff voltage at which the constant-current charging (CC) mode ends, and a voltage magnitude in a constant-voltage charging (CV) mode.

According to another embodiment, the battery service server may be configured to determine the degree of degradation of the battery by analyzing the diagnostic analysis data collected from the electric vehicle control device in real time, and store the determined degree of degradation in the database to be matched with the battery identification code.

According to still another embodiment, the battery service server may be configured to train a correlation between the diagnostic analysis data and the degree of degradation using diagnostic analysis data and degradation information of other batteries stored as big data in the database by means of an artificial intelligence model, and determine the degree of degradation of the battery from the diagnostic analysis data collected from the electric vehicle control device by using the trained artificial intelligence model.

Preferably, the battery service server may be configured to train the artificial intelligence model by using diagnostic analysis data and degradation information collected for other batteries of the same model.

According to an embodiment, the battery service server may be configured to: receive an identification code of the battery mounted to the electric vehicle and utilization application information for battery performance management service through a user interface provided by the electric vehicle control device through an integrated information display of the electric vehicle or a mobile communication terminal of a user; and generate update information of the charging/discharging control logic for a battery for which the utilization application information is received, and provide the update information to the electric vehicle control device.

Preferably, the battery service server may be configured to further receive payment information when receiving the utilization application information, and charge for the generation and provision of the update information of the charging/discharging control logic.

According to another embodiment, the battery service server may be configured to calculate a residual value corresponding to the determined degree of degradation by referring to a residual value look-up table defining the residual value of the battery according to the degree of degradation of the battery, and provide the calculated residual value through an integrated information display of the electric vehicle coupled with the electric vehicle control device or a display of a mobile communication terminal of a user.

According to still another embodiment, the battery service server may be configured to further receive an accumulative charging/discharging amount of the battery from the electric vehicle control device together with the diagnostic analysis data, calculate the usage fee of the battery according to the accumulative charging/discharging amount and the degree of degradation, and provide the calculated usage fee through an integrated information display of the electric vehicle coupled with the electric vehicle control device or a display of a mobile communication terminal of a user.

In the present disclosure, the external server may be an insurance company server of an insurance company, and the battery service server may be configured to receive a battery identification code from the insurance company server through the network, determine residual value information of the battery corresponding to the received battery identification code by referring to the database, and provide the determined residual value information of the battery to the insurance company server.

According to another embodiment, the external server may be an electronic commerce server of a used electric vehicle trading company, and the battery service server may be configured to receive a battery identification code from the electronic commerce server through the network, determine residual value information of the battery corresponding to the received battery identification code by referring to the database, and provide the determined residual value information of the battery to the electronic commerce server.

According to still another embodiment, the external server may be a warranty certification server of a battery guaranteeing company that requests warranty certification for the battery, and the battery service server may be configured to receive a battery identification code from the warranty certification server through the network, determine whether a warranty flag corresponding to the received battery identification code exists in the database by referring to the database, and provide a warranty certification success message to the warranty certification server when the warranty flag exists.

According to still another embodiment, the battery service server may be configured to: receive target advertisement information according to a location coordinate from an advertisement server and store the received target advertisement information in the database; and further receive driving information about a moving path of the electric vehicle while receiving the diagnostic analysis data from the electric vehicle control device, inquire target advertisement information matched with the moving path of the electric vehicle from the database, and provide the inquired target advertisement information through an integrated information display of the electric vehicle coupled with the electric vehicle control device or a display of a mobile communication terminal of a user.

Preferably, the battery service server may be configured to collect the diagnostic analysis data from the electric vehicle control device through a charging station while the battery of the electric vehicle is being charged at the charging station, or collect the diagnostic analysis data from the electric vehicle control device while the electric vehicle is running or stationary.

In another aspect of the present disclosure, there is also provided a battery service providing method, comprising: a step of collecting diagnostic analysis data including operation characteristic information of a battery and driving characteristic information of an electric vehicle from an electric vehicle control device through a network and storing the diagnostic analysis data in a database; a step of determining a degree of degradation of the battery from the diagnostic analysis data; and any one step selected from the group consisting of steps of generating update information of a charging/discharging control logic of the battery according to the determined degree of degradation and providing the update information to the electric vehicle control device; determining a residual value of the battery based on the determined degree of degradation; determine a usage fee of the battery based on the determined degree of degradation; transmitting the usage fee or the residual value of the battery to an external server according to a request of the external server; and setting a warranty flag for the battery whose charging and discharging is controlled according to the update information of the charging/discharging control logic.

Advantageous Effects

According to the present disclosure, it is possible to reliably evaluate the battery performance of an electric vehicle and to optimize the charging/discharging control logic of the battery to be matched with the performance of the battery, thereby not only extending the service life of the battery but also improving the safety of the battery use.

In addition, by providing reliable information on the remaining life of the battery to the user of the electric vehicle, it is possible to induce replacement of the battery at an appropriate time, and also to enhance the reliability of a battery manufacturer.

In addition, by building a database on correlation data between driving habits of an electric vehicle user and a remaining battery life, the database may be used as accurate data for insurance premium calculation of automobile insurance companies.

In addition, by providing a method to reasonably determine the residual value of the electric vehicle battery, it is possible to activate the electric vehicle insurance market and the used car trading market.

In addition, by providing a meter-rate billing service that allows the battery mounted to the electric vehicle to be used in a rental manner, it is possible to reduce the burden of purchasing an electric vehicle and consequently to promote rapid expansion of the electric vehicle market.

In addition, by providing a performance guarantee service (warranty service) for a battery that has undergone performance management on a regular basis, it is possible to guarantee reliability of performance when distributing an electric vehicle equipped with the corresponding battery or when the corresponding battery is reused.

In addition, by exposing target advertisement information matched with the moving path of the electric vehicle to the user of the electric vehicle, it is possible to maximize the advertisement effect.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 9 is a diagram exemplarily showing a structure of an artificial neural network according to an embodiment of the present disclosure.

FIG. 10 is a diagram exemplarily showing a structure of an auxiliary artificial neural network according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
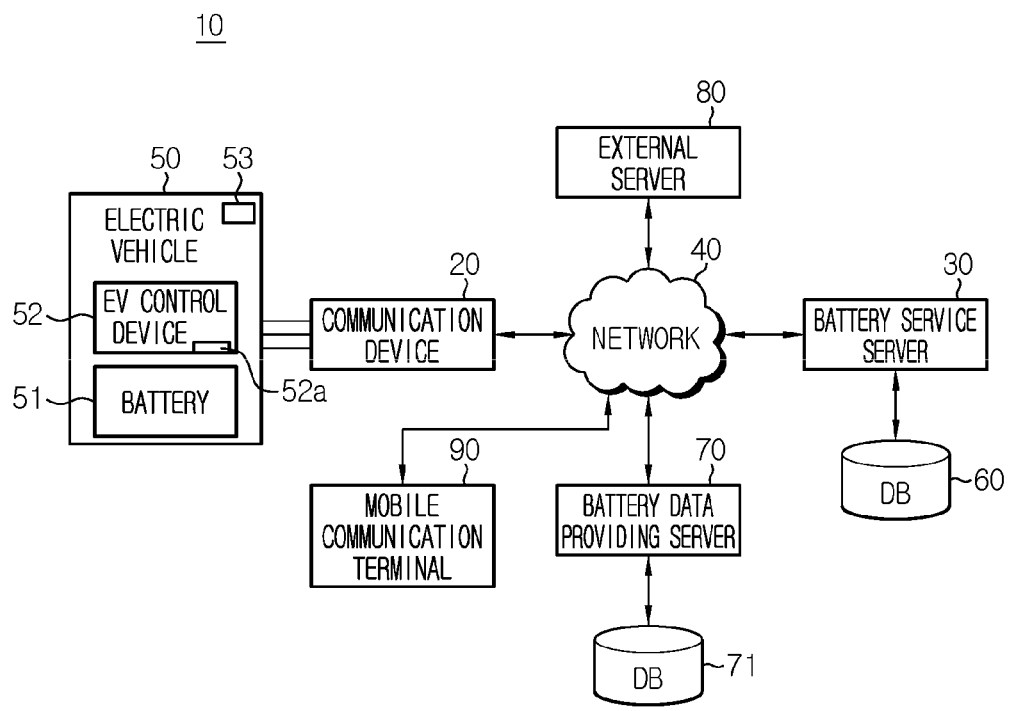
FIG. 1 is a block diagram showing a configuration of a battery service providing system according to an embodiment of the present disclosure.

FIG. 1 is a block diagram showing a configuration of a battery service providing system 10 according to an embodiment of the present disclosure.

Referring to FIG. 1, the battery service providing system 10 according to an embodiment of the present disclosure provides various services for a battery 51 mounted to an electric vehicle 50.

The electric vehicle 50 includes an electric vehicle control device 52 that overall controls charging and discharging of the battery 51 and the operation of the electric vehicle 50.

The electric vehicle control device 52 is a computer device that controls the charging/discharging operation of the battery 51, and measures the voltage, current, and temperature of the battery 51 during charging/discharging of the battery 51 and records the same in a storage means 52a. The electric vehicle control device 52 may also perform a control operation for a mechanical mechanism and/or an electronic mechanism related to the operation of the electric vehicle 50.

The storage means 52a is a non-transitory memory device and is a computer storage medium capable of writing and/or erasing and/or modifying and/or transferring data. The storage means 52a may be, for example, a flash memory, a hard disk, a solid state disk (SSD), or other type of hardware for data storage.

The electric vehicle control device 52 is a computer device mounted to the electric vehicle 50, which is widely known in the art and commercialized, and thus will not be described in detail here.

Preferably, the electric vehicle control device 52 transmits and receives information and/or data to and from a battery service server 30 through a communication device 20. A network 40 supporting data communication is interposed between the communication device 20 and the battery service server 30.

The network 40 is not limited in its type as long as it supports communication between the communication device 20 and the battery service server 30.

The network 40 includes a wired network, a wireless network, or a combination thereof. The wired network includes a local area or wide area Internet that supports the TCP/IP protocol. The wireless network includes a wireless communication network based on a base station, a satellite communication network, a local area wireless communication network such as Wi-Fi, or a combination thereof.

The network 40 may include, for example, 2G (second generation) to 5G (fifth generation) networks, LTE (Long Term Evolution) network, GSM (Global System for Mobile communication) network, CDMA (Code Division Multiple Accesses) network, EVDO (Evolution-Data Optimization) network, PLM (Public Land Mobile) network, and/or other networks.

The network 40 may include, as another example, LAN (Local Area Network), WLAN (Wireless Local Area Network), WAN (Wide Area Network), MAN (Metropolitan Network), PSTN (Public Switched Telephone Network), Ad hoc network, managed IP network, VPN (Virtual Private Network), intranet, Internet, fiber-based network, and/or combinations thereof, or other types of networks.

The communication device 20 is a communication unit that mediates the exchange of data between the electric vehicle control device 52 included in the electric vehicle and the battery service server 30.

In one example, the communication device 20 may be provided inside the electric vehicle 50.

In another example, when the electric vehicle 50 is charged at a charging station (not shown), the communication device 20 may be provided at the charging station. In this case, the communication device 20 and the electric vehicle control device 52 may transmit and receive data to each other through a data communication cable included in the standardized charging cable.

The communication device 20 is not particularly limited as long as it may send and receive data to and from the battery service server 30 through the network 40. For example, the communication device 20 may be a communication modem supporting a wired or wireless communication protocol known in the art.

As another example, the communication device 20 may be a separate module or set-top box installed in a designated place. The designated location may be a charging station of the electric vehicle 50, a parking lot of a house in which the user of the electric vehicle 50 resides, or a parking lot of a workplace where the user of the electric vehicle 50 works.

The electric vehicle control device 52 may collect operation characteristic information of the battery 51 while the battery 51 is being charged or discharged, and record the operation characteristic information in the storage means 52a. The operation characteristic information may include at least one selected from voltage, current and temperature of the battery 51. The electric vehicle control device 52 may record the operation characteristic information of the battery 51 together with SOC (State Of Charge) of the battery 51 and/or time stamp in the storage means 52a.

The electric vehicle control device 52 may estimate the SOC of the battery 51 by using an ampere counting method, an OCV method, an extended Kalman filter, or the like known in the art. The electric vehicle control device 52 may be electrically coupled to a voltage sensor, a current sensor and a temperature sensor installed at the battery 51 in order to collect the operation characteristic information of the battery 51.

Preferably, the voltage, current and temperature of the battery 51 may be stored in the storage means 52a in the form of a profile according to the SOC (State Of Charge) of the battery 51.

Here, the profile is a data set representing the changes in voltage, current, and temperature according to the SOC of the battery 51. The data set may be represented by a multidimensional vector ($SOC_k$, $I_k$, $V_k$, $T_k$d). k is an index for a measurement time point of the operation characteristic. If the number of measurements is n, k is a natural number from 1 to n. The battery operation characteristic profile may include a voltage profile ($SOC_k$, $V_k$) according to the SOC, and may optionally include a current profile ($SOC_k$, $I_k$) and/or a temperature profile ($SOC_k$, $T_k$) according to the SOC.

The electric vehicle control device 52 may record driving characteristic information of the electric vehicle 50 in the storage means 52a. The driving characteristic information includes a speed change profile and a driving distance accumulative profile of the electric vehicle 50. Optionally, the driving characteristic information may further include coordinate data for a moving path of the electric vehicle 50. The speed change profile includes a set of speed data ($SOC_k$, $Velocity_k$, $t_k$) according to the SOC of the battery 51. Here, velocity and t are a driving speed and a time stamp of the electric vehicle 50, respectively. The driving distance accumulative profile includes a set of driving distance accumulative data ($Q_k$, $d_k$, $t_k$) according to an accumulative discharge amount of the battery 51. Here, Q, d, and k are an accumulative discharge amount, an accumulative driving distance, and a time stamp, respectively. Optionally, the driving characteristic information may include a driving time of the electric vehicle 50 for each humidity section.

Preferably, the electric vehicle control device 52 may record the driving characteristic information of the electric vehicle 50 together with a time stamp in the storage means 52*a*. The electric vehicle control device 52 may be electrically coupled to a speed sensor, a GPS sensor and a humidity sensor installed at the electric vehicle 50 in order to collect and store the driving characteristic information.

Preferably, the battery service providing system 10 according to an embodiment of the present disclosure may include a database 60 connected to the battery service server 30 so as to be accessed by the battery service server 30.

Figure 2:
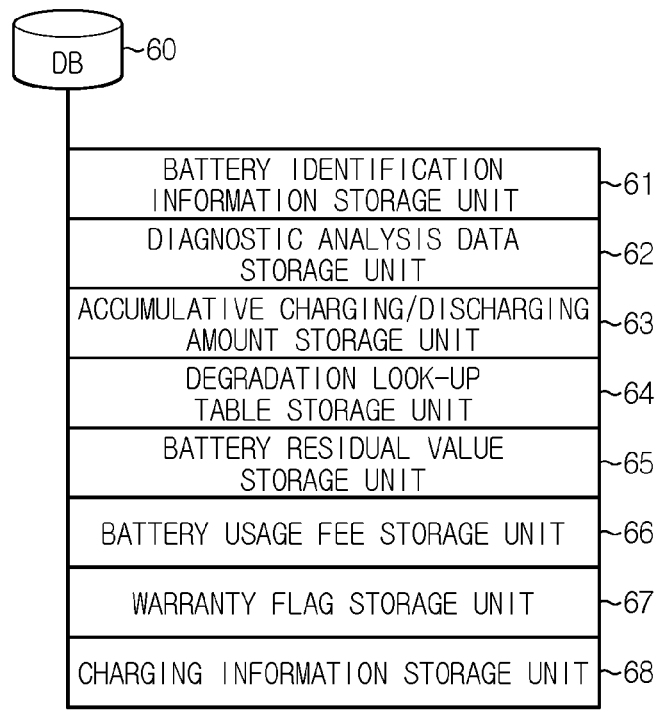
FIG. 2 is a block diagram showing a configuration of a database according to an embodiment of the present disclosure.

FIG. 2 is a block diagram showing a configuration of the database 60 according to an embodiment of the present disclosure.

Referring to FIG. 2, the database 60 may include a battery identification information storage unit 61. The battery identification information storage unit 61 is an information storage area for recording a battery model code, a battery identification code, an electric vehicle model code equipped with a battery, an electric vehicle identification code, a battery installation date, and the like. The type of information recorded in the battery identification information storage unit 61 may be added or changed.

The database 60 may also include a diagnostic analysis data storage unit 62. The diagnostic analysis data storage unit 62 is an information storage area in which diagnostic analysis data collected from the electric vehicle control device 52 is recorded. The area where the diagnostic analysis data is stored is allocated for each battery 51 assigned with a battery identification code. The type of information recorded in the diagnostic analysis data storage unit 62 may be added or changed.

In an example, the diagnostic analysis data includes at least one selected from the group consisting of a speed change profile, a driving distance accumulative profile, and a battery operation characteristic profile of the electric vehicle 50. The battery operation characteristic profile is latest charging characteristic information and includes voltage, current, and temperature change profile according to the SOC of the battery 51.

In another example, the diagnostic analysis data may comprise operation characteristic accumulative information for the battery 51 and may include at least one selected from the group consisting of an accumulative operation time for each voltage section, an accumulative operation time for each current section, and an accumulative operation time for each temperature section for the battery 51 mounted to the electric vehicle 50.

In still another example, the diagnostic analysis data may comprise driving characteristic accumulative information for the electric vehicle 50, and may include at least one selected from the group consisting of an accumulative driving time for each speed section, an accumulative driving time for each driving area, and an accumulative driving time for each humidity section for the electric vehicle 50.

The database 60 also includes an accumulative charging/discharging amount storage unit 63. The accumulative charging/discharging amount storage unit 63 is an information storage area in which information about accumulative charging/discharging amount accumulated by integrating the charging/discharging amount of the battery is recorded. The area where the accumulative charging/discharging amount is stored is allocated for each battery 51 assigned with a battery identification code. The type of information recorded in the accumulative charging/discharging amount storage unit 63 may be added or changed.

The database 60 includes a degradation look-up table storage unit 64. The degradation look-up table storage unit 64 is an information storage area in which voltage profile information according to SOC is recorded for each degree of degradation of the battery 51. The area in which the voltage profile information is stored for each degree of degradation is allocated to each battery assigned with the same battery model code. The degradation look-up table storage unit 64 may be defined in advance using data provided by a battery manufacturer and stored in the database 60. The type of information recorded in the degradation look-up table storage unit 64 may be added or changed.

The database 60 may also include a battery residual value storage unit 65. The battery residual value storage unit 65 is an information storage area in which the residual value of the battery 51 is stored. The residual value may be calculated for each battery assigned with a battery identification code. The residual value is determined from the degree of degradation of the battery. For example, as the SOH is lower since the degree of degradation is large, the residual value decreases. The correlation between the residual value and the degree of degradation may be predefined by a function. The type of information recorded in the battery residual value storage unit 65 may be added or changed.

The database 60 may also include a battery usage fee storage unit 66. The battery usage fee storage unit 66 is an information storage area in which battery usage fee information calculated based on the accumulative charging/discharging amount and the increase of the degree of degradation of the battery 51 (the decrease of SOH) is stored. The battery usage fee is calculated after the battery endowed with a battery identification code is mounted to the electric vehicle 50. If the user of the electric vehicle 50 pays the battery usage fee, the battery usage fee may be initialized to 0. Preferably, the battery 51 for which the battery usage fee is calculated is a battery that has applied for a battery rental service, explained later. Whether or not to apply for rental of a battery may be identified by setting a rental flag in the battery identification information storage unit 61. The type of information recorded in the battery usage fee storage unit 66 may be added or changed.

The database 60 may also include a warranty flag storage unit 67. The warranty flag storage unit 67 is an information storage area in which a warranty flag endowed when a performance management service is regularly provided for a predetermined time for the battery 51 mounted to the electric vehicle 50 is stored. The type of information recorded in the warranty flag storage unit 67 may be added or changed.

The database 60 may also include a charging information storage unit 68. The charging information storage unit 68 is an information storage area in which information such as an identification code of the battery 51, an identification code (ID) of the user of the electric vehicle 50 equipped with the battery 51, a charging amount, a payment means, and payment date and time is recorded, when various battery services according to the present disclosure are provided for a fee. The type of information recorded in the charging information storage unit 68 may be added or changed.

When information and/or data are stored in the database 60, it is preferable that the information and/or data are stored to be matched with appropriate identification information. The identification information may include at least one selected from the group consisting of an electric vehicle model code, an electric vehicle identification code, a battery model code, a battery identification code, and a user identification code (ID).

In the present disclosure, the database 60 may preferably be a relational database. In this case, each of the storage units described above may be configured in the form of a table. Of course, it is not limited to configure each storage unit as a typical file database. Therefore, it is obvious that the database 60 can be constructed with any type of database known in the art, such as a relational database and a file directory database. In addition, the storage units exemplified above are only examples, and there is no particular limitation on the type of information or data that can be recorded and managed in the database 60.

Referring to FIG. 1 again, the battery service server 30 may the collect diagnostic analysis data about the electric vehicle 50 from a charging station through the network 40 while the electric vehicle 50 is being charged at the charging station, and store the collect diagnostic analysis data in the database 60.

Here, the diagnostic analysis data may include a speed change profile according to the SOC of the electric vehicle 51 and/or a driving distance accumulative profile according to the accumulative discharging amount and/or a battery operation characteristic profile according to the SOC. In addition, the diagnostic analysis data may include an electric vehicle model code and/or an electric vehicle identification code and/or a battery model code and/or a battery identification code as data identification information. In addition, the diagnostic analysis data may optionally further include moving path information of the electric vehicle 50.

Optionally, the diagnostic analysis data may comprise operation characteristic accumulative information for the battery 51, and may include at least one selected from the group consisting of an accumulative operation time for each voltage section, an accumulative operation time for each current section, and an accumulative operation time for each temperature section for the battery 51 of the electric vehicle 50.

Optionally, the diagnostic analysis data may comprise driving characteristic accumulative information for the electric vehicle 50, and may include at least one selected from the group consisting of an accumulative driving time for each speed section, an accumulative driving time for each driving area, and an accumulative driving time for each humidity section.

It is obvious that the diagnostic analysis data may further include other data sets indicating electrochemical operation characteristics of the battery 51 as required, and some of the data mentioned above may be excluded depending on the level of diagnostic analysis.

As will be described later, at least some of the diagnostic analysis data may be used to train an artificial intelligence model.

In order to collect the diagnostic analysis data, the communication device 20 may be provided in the charging station, and the communication device 20 may transmit and receive data to and from the electric vehicle control device 52 inside the electric vehicle 50.

The voltage, current and temperature information included in the diagnostic analysis data may be collected by the electric vehicle control device 52 while the battery 51 of the electric vehicle 50 is being charged at the charging station.

The charging station may exchange information and/or data by communicating with the electric vehicle control device 52 while the electric vehicle 50 is being charged. In one example, the communication is performed via a data communication line included in a charging cable. Alternatively, the communication is performed via wireless communication between the charging station and the electric vehicle 50. To this end, the charging station and the electric vehicle 50 may include short-range wireless communication devices.

The charging station may transmit the information and/or data collected from the electric vehicle 50 to the battery service server 30 through the network 40 according to a predefined communication protocol.

The electric vehicle control device 52 generates diagnostic analysis data while the electric vehicle 50 is running or while the electric vehicle 50 is being charged at the charging station, and records the same in the storage means 52*a*. If there is a request from the charging station, the electric vehicle control device 52 reads the diagnostic analysis data recorded in the storage means 52*a* and transmits the same to the communication device 20 included in the charging station through the data communication cable of the charging cable or through short-range wireless communication.

In another example, the battery service server 30 may collect the diagnostic analysis data about the battery 51 of the electric vehicle 50 through the network 40 from the communication device 20 included in the electric vehicle 50 while the electric vehicle 50 is running, and store the same in the database 60. If there is a request to transmit diagnostic analysis data from the battery service server 30 through the communication device 20, the electric vehicle control device 52 may read the diagnostic analysis data recorded in the storage means 52*a* and transmit the same to the battery service server 30 through the communication device 20.

In still another example, when the electric vehicle 50 is parked, the battery service server 30 may collect the diagnostic analysis data about the battery 51 of the electric vehicle 50 through the network 40 from the communication device 20 separately installed in the parking place, and store the same in the database 60. If there is a request to transmit the diagnostic analysis data from the battery service server 30 through the communication device 20 separately installed out of the electric vehicle 50, the electric vehicle control device 52 may read the diagnostic analysis data recorded in the storage means 52*a* and transmit the same to the battery service server 30 through the communication device 20.

According to an embodiment, the battery service server 30 may analyze the accumulative operation time for each voltage section, the accumulative operation time for each current section, and the accumulative operation time for each temperature section of the battery 51 included in the diagnostic analysis data to generate frequency distribution for each voltage, current and temperature, and then record the same in the diagnostic analysis data storage unit 62 of the database 60 to be matched with the model code of the electric vehicle 50 and/or the identification code of the electric vehicle 50 and/or the model code of the battery 51 and/or the identification code of the battery 51.

According to an embodiment, in the frequency distribution data, the variable may be voltage, current or temperature, and the frequency may be the accumulative operation time of the battery 51 in each variable.

Figure 3:
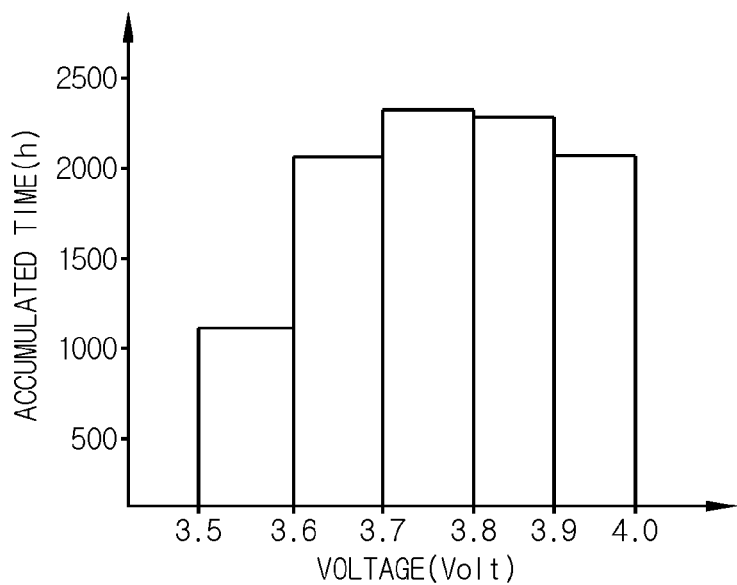
FIGS. 3 to 5 are graphs exemplarily showing frequency distribution data generated from operation characteristic accumulative information of an electric vehicle battery according to an embodiment of the present disclosure.
Figure 4:
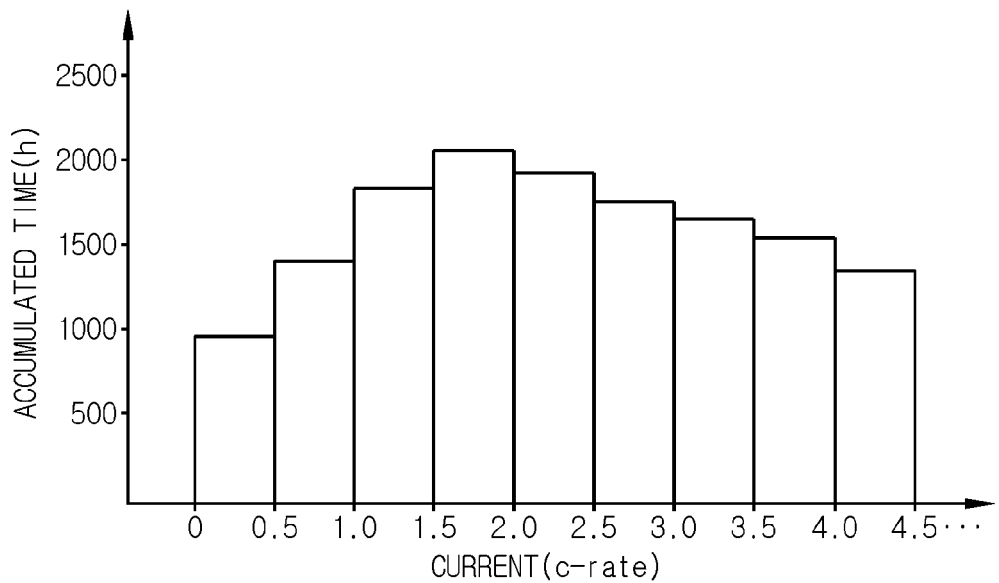
Figure 5:
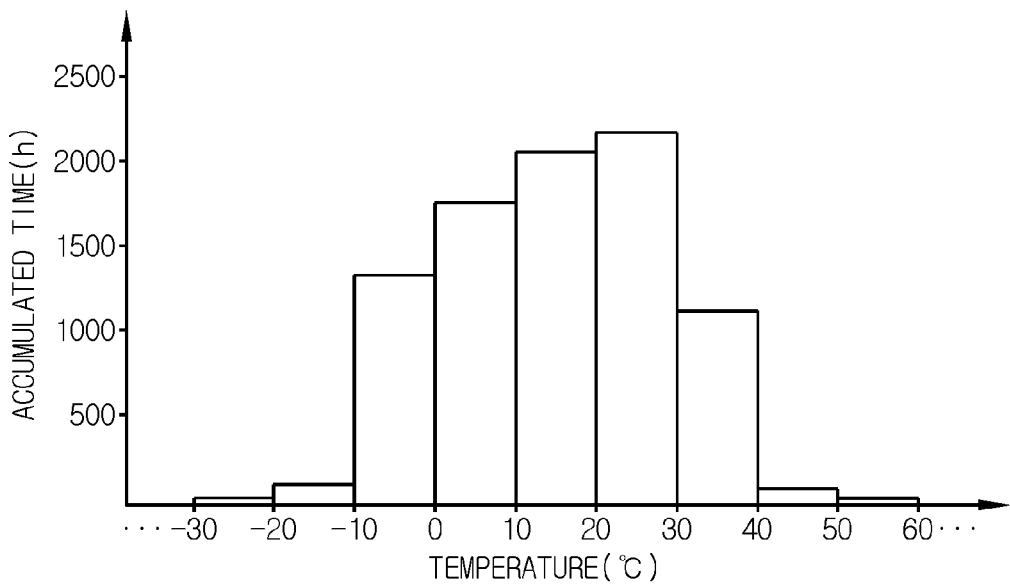

FIG. 3 is a graph showing an example of the frequency distribution data for voltage of the battery 51, FIG. 4 is a graph showing an example of the frequency distribution data for current of the battery 51, and FIG. 5 is a graph showing an example of the frequency distribution data for temperature of the battery 51.

Referring to FIGS. 3 to 5, the frequency distribution data may provide accumulative operation time of the battery 51 at each voltage section, accumulative operation time of the battery 51 at each current section and accumulative operation time of the battery 51 at each temperature section while the electric vehicle 50 is running. The frequency distribution data may be used for the battery service server 30 to train the artificial intelligence model. This will be described later.

According to another embodiment, the battery service server 30 may analyze the accumulative driving time for each speed section and/or the accumulative driving time for each driving area and/or the accumulative driving time for each humidity section of the electric vehicle 50 included in the diagnostic analysis data to generate frequency distribution data on the driving characteristic of the electric vehicle 50, and then record the same in the diagnostic analysis data storage unit 62 of the database 60 to be matched with the model code of the electric vehicle 50 and/or the identification code of the electric vehicle 50 and/or the model code of the battery 51 and/or the identification code of the battery 51.

In the frequency distribution data for the driving characteristic, the variable is speed of the electric vehicle 50, driving area of the electric vehicle 50 or humidity of the area in which the electric vehicle 50 is driven, and the frequency may be accumulative driving time of the electric vehicle 50 in each variable.

Figure 6:
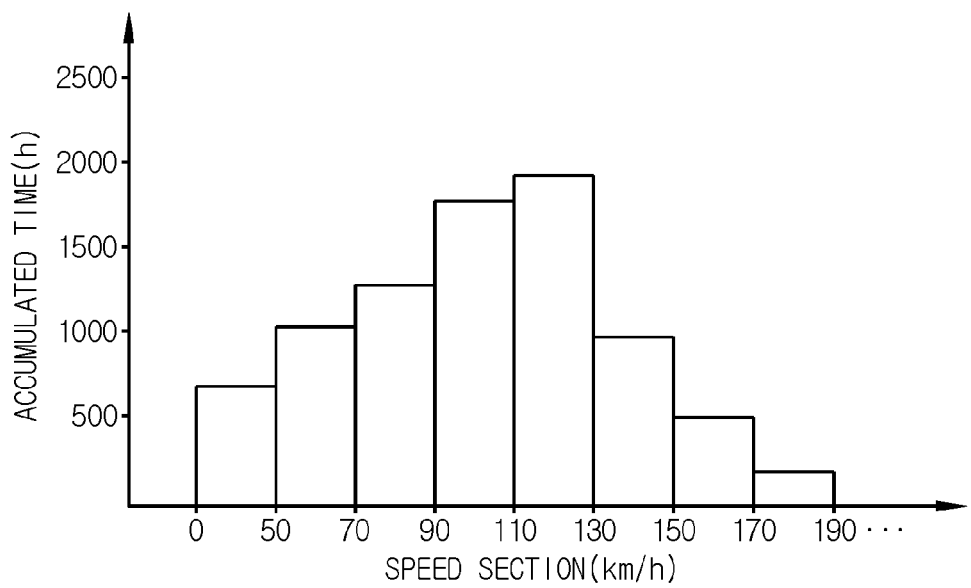
FIGS. 6 to 8 are graphs exemplarily showing frequency distribution data generated from driving characteristic accumulative information of an electric vehicle according to an embodiment of the present disclosure.
Figure 7:
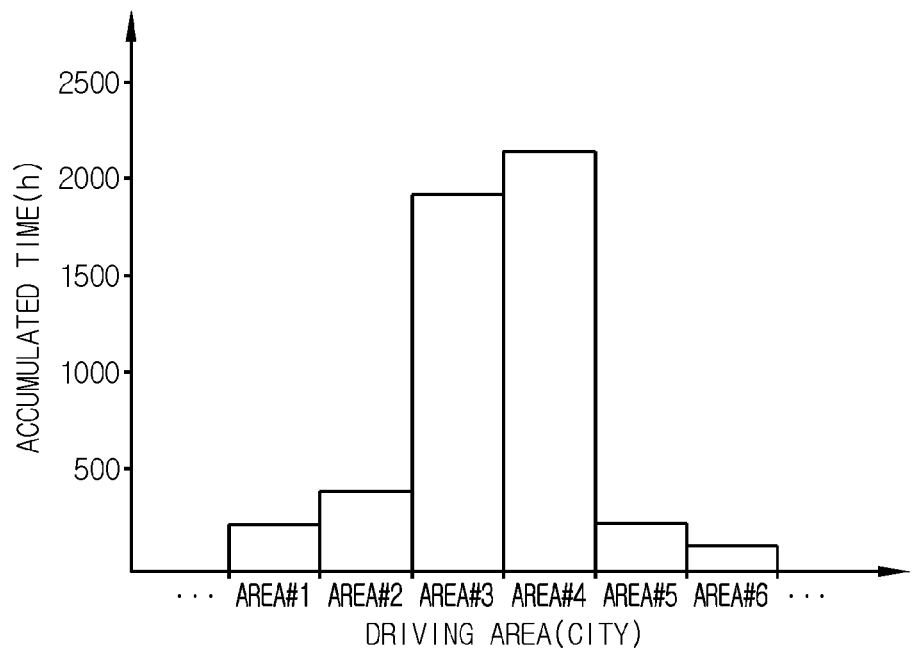
Figure 8:
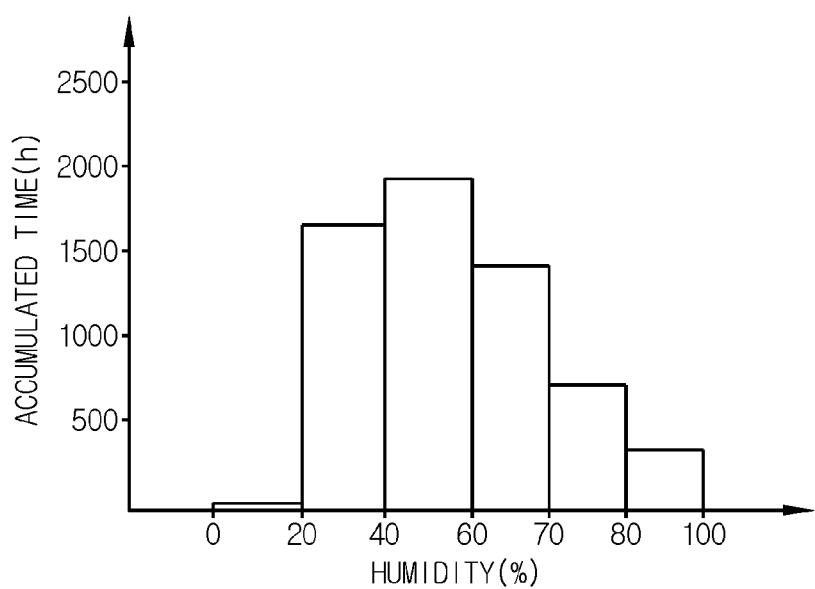

FIG. 6 is a graph showing an example of the frequency distribution data for speed of the electric vehicle 50, FIG. 7 is a graph showing example of the frequency distribution data for driving area of the electric vehicle 50, and FIG. 8 is a graph showing an example of the frequency distribution data for humidity of an area in which the electric vehicle 50 is running.

Referring to FIGS. 6 to 8, the frequency distribution data may provide information about accumulative driving time at each speed section, accumulative driving time at each driving area, and accumulative driving time at each humidity section of the electric vehicle 50 while the electric vehicle 50 is running. The area may be a domestic and/or foreign administrative area. As an example, the area may be a city, but the present disclosure is not limited thereto. The frequency distribution data may be used for the battery service server 30 to train the artificial intelligence model. This will be described later.

According to another embodiment, when a predetermined condition is met, the battery service server 30 may determine the degree of degradation of the battery 51 by using the operation characteristic profile of the battery 51 included in the diagnostic analysis data, and record the degree of degradation in the diagnostic analysis data storage unit 62 of the database 60 to be matched with the model code of the electric vehicle 50 and/or the identification code of the electric vehicle 50 and/or the model code of the battery 51 and/or the identification code of the battery 51. As will be described later, the degree of degradation stored in the diagnostic analysis data storage unit 62 may be used for training the artificial intelligence model.

In an example, the battery service server 30 determines whether the operation characteristic profile of the battery 51 is collected in a preset degradation estimation voltage section. To this end, the battery service server 30 may examine the voltage distribution of the voltage profile according to the change of SOC. If the determination is YES, the battery service server 30 may determine a charge capacity change amount by integrating the current data measured in the degradation estimation voltage section, and determine the ratio of the charge capacity change amount to a reference charge capacity change amount as the degree of degradation. The reference charge capacity change amount is a charge capacity change amount represented while the battery 51 in a BOL state is being charged in the degradation estimation voltage section, and the reference charge capacity change amount may be recorded in advance in the database 60 for each model of the battery 51.

In another example, the battery service server 30 analyzes the operation characteristic profile ($SOC_k$, $V_k$, $I_k$, $T_k$) of the battery 51 included in the diagnostic analysis data to determine whether the battery 51 is charged within the preset degradation estimation voltage section and a plurality of voltage data are measured under variable charging current conditions. To this end, the battery service server 30 may examine the distribution of voltage data $V_k$ and current data $I_k$. If the determination is YES, the battery service server 30 may perform linear regression analysis on the plurality of current and voltage data measured within the preset degradation estimation voltage section to determine an average value of $|dV/dI|$ as an internal resistance value of the battery 51, and determine the ratio of a reference internal resistance value to the internal resistance value as the degree of degradation of the battery 51. For application of this embodiment, the charging station may apply charging pulses with different AC charging currents and/or amplitudes to the battery 51 while the battery 51 is being charged within the preset degradation estimation voltage section. Then, a plurality of voltage data may be measured under variable charging current conditions. The reference internal resistance value is an internal resistance value of the battery 51 in a BOL state, and the reference internal resistance value may be recorded in advance in the database 60 for each battery model.

In still another example, the battery service server 30 may determine the degree of degradation of the battery 51 in real time by using the extended Kalman filter. A method of determining the degree of degradation using an extended Kalman filter is disclosed in Korean Unexamined Patent Application No. 2007-0074621, the disclosures of which are incorporated herein by reference. The disclosed method is a method that may determine the degree of degradation from voltage, current and temperature of a battery in real time using the extended Kalman filter, which is one of the adaptive algorithms, and is particularly useful when applied to the present disclosure.

Preferably, the battery service server 30 may determine the degree of degradation of the battery 51 of the electric vehicle 50 based on big data by using the operation characteristic profile of the battery 51 included in the diagnostic analysis data and the degradation look-up table storage unit 64 of the database 60.

That is, the battery service server 30 identifies a battery model by searching the battery identification information storage unit 61 by using the battery identification code included in the diagnostic analysis data. Then, the battery service server 30 may identify a voltage profile with highest similarity to the voltage profile included in the diagnostic analysis data by referring to the voltage profile information for each SOH corresponding to the same model from the degradation look-up table storage unit 64, and determine the degree of degradation corresponding to the identified voltage profile as the degree of degradation of the battery 51.

In still another embodiment, the battery service server 30 may determine the degree of degradation of the battery 51 by using an artificial intelligence model.

In this case, the degree of degradation determined from the operation characteristic profile of the battery 51 as described above constitutes a part of the big data used to train the artificial intelligence model, and the actual degree of degradation of the battery 51 may be determined by the artificial intelligence model trained based on the big data.

The reason is that, since the SOH calculated from the latest operation characteristic profile of the battery 51 has is a limitation in that it can be determined only when a predetermined condition is satisfied and the past usage history of the battery 51 and the driving history of the electric vehicle 50 are not sufficiently considered, and thus the degree of degradation determined by the artificial intelligence model trained based on big data has higher accuracy and reliability.

Preferably, the artificial intelligence model is a software algorithm coded with a programming language, and may be an artificial neural network. However, the present disclosure is not limited thereto.

FIG. 9 is a diagram exemplarily showing a structure of an artificial neural network 100 according to an embodiment of the present disclosure.

Referring to FIG. 9, the artificial neural network 100 includes an input layer 101, a plurality of hidden layers 102, and an output layer 103. The input layer 101, the plurality of hidden layers 102 and the output layer 103 include a plurality of nodes.

When the battery service server 30 trains the artificial neural network 100 or determines the degree of degradation of the battery 51 by using the artificial neural network 100, the frequency distribution data (FIGS. 3 to 5) generated from the operation characteristic accumulative information of the battery 51, the frequency distribution data (FIGS. 6 to 8) generated from the driving characteristic accumulative information of the electric vehicle 50, and the data included in the operation characteristic profile of the battery 51 may be input to the input layer 101.

The operation characteristic accumulative information input (assigned) to the nodes of the input layer 101 may include a first accumulative time value for each voltage section and/or a second accumulative time value for each current section and/or a third accumulative time value for each temperature section. The first to third accumulative time values are preferably normalized as a ratio based on a total usable time corresponding to the guaranteed life of the battery 51. In an example, if the accumulative time value in a specific voltage section is 1,000 hours and the total available time is 20,000 hours, the normalized accumulative time value is $\frac{1}{20}$ (0.05).

The number of first accumulative time values may correspond to the number of voltage sections, the number of second accumulative time values may correspond to the number of current sections, and the number of third accumulative time values may correspond to the number of temperature sections. For example, if the number of voltage sections is 5, the number of current sections is 9, and the number of temperature sections is 10, the numbers of first to third accumulative time values are 5, 9, and 10, respectively.

Preferably, the input layer 101 may include a number of nodes corresponding to the number of first accumulative time values and/or the number of second accumulative time values and/or the number of third accumulative time values.

The driving characteristic accumulative information input (assigned) to the nodes of the input layer 101 may include a fourth accumulative time value for each speed section and/or a fifth accumulative time value for each driving area and/or a sixth accumulative time value for each humidity section. The fourth to sixth accumulative time values are preferably normalized as a ratio based on the total usable time corresponding to the guaranteed life of the battery 51. In an example, if the accumulative time value in a specific speed section is 2,000 hours and the total available time is 20,000 hours, the normalized accumulative time value is $\frac{1}{10}$ (0.1).

The number of fourth accumulative time values corresponds to the number of speed sections, the number of fifth accumulative time values corresponds to the number of areas in which the electric vehicle 50 is driven, and the number of sixth accumulative time values corresponds to the number of humidity sections. For example, if the number of speed sections is 8, the number of driving areas is 20, and the number of humidity sections is 6, the numbers of fourth to sixth accumulative time values are 8, 20, and 6, respectively.

Preferably, the input layer 101 may include a number of nodes corresponding to the number of fourth accumulative time values and/or the number of fifth accumulative time values and/or the number of sixth accumulative time values.

The operation characteristic profile data of the battery 51 input (assigned) to the nodes of the input layer 101 may include voltage data and temperature data measured for each SOC. Since both the voltage and temperature of the battery 51 are measured for each SOC, 100 nodes may be assigned for inputting the voltage data, and another 100 nodes may be assigned for inputting the temperature data.

Here, 100 is the number of nodes corresponding to SOC from 1% to 100%, assuming that the SOC varies by 1% from 0% to 100%. If the voltage and temperature of the battery 51 are measured in the SOC section of 31% to 50%, voltage data may be input to 20 nodes corresponding to 31% to 50%, and temperature data may be input to another 20 nodes corresponding to 31% to 50%. In addition, voltage data and temperature data may not be input to nodes corresponding to SOC of 1% to 30% section and SOC of 51% to 100% section, and 0 may be assigned thereto.

Meanwhile, voltage data and temperature data measured in SOC including a value below a decimal point may be converted into voltage data and temperature data of a nearby SOC without a decimal point through interpolation or extrapolation. In some cases, the temperature data may be excluded from the input data in order to reduce the amount of training computation of the artificial neural network. In this case, the input layer 101 may not include nodes to which temperature data is input.

The output layer 103 may include a node to which degradation information of the battery 51 is output. As shown in FIG. 9, if the artificial neural network 100 is designed based on a stochastic model, the output layer 103 may include a plurality of nodes for outputting the probability distribution of the degree of degradation of the battery 51.

In an example, if the artificial neural network 100 is designed to determine the degree of degradation between 71% and 100% in the unit of 1%, the output layer 103 may include 30 nodes in total. In this case, the degree of degradation corresponding to a node outputting the highest probability value among the 30 nodes may be determined as the degree of degradation of the battery 51. For example, if the probability output from the $10^{th}$ node is highest, the degree of degradation of the battery 51 may be determined to be 80%. Alternatively, after obtaining the sum of the values obtained by multiplying the probability output from each node and the corresponding degree of degradation, the average of the sums may be determined as the degree of degradation. It is obvious to those skilled in the art that the number of nodes can be further increased to improve the accuracy of the degree of degradation.

Alternatively, if the artificial neural network 100 is designed based on a deterministic model, the output layer 103 may include at least one node for directly outputting the degree of degradation of the battery 51.

The number of the hidden layers 102 interposed between the input layer 101 and the output layer 103 and the number of nodes included in each hidden layer 102 may be appropriately selected in consideration of the amount of training computation of the artificial neural network 100 and the accuracy and reliability of the artificial neural network 100.

In the artificial neural network 100, a sigmoid function may be used as the activation function. Alternatively, various activation functions known in the art, such as a SiLU (Sigmoid Linear Unit) function, a ReLu (Rectified Linear Unit) function, a softplus function, an ELU (Exponential Linear Unit) function, a SQLU (Square Linear Unit) function, or the like may be used.

In the artificial neural network 100, initial values of connection weights and biases between nodes may be set randomly. In addition, the connection weights and the biases may be optimized in the process of training the artificial neural network.

In one embodiment, the artificial neural network may be trained by a backpropagation algorithm. Also, the connection weights and biases may be optimized by an optimizer while the artificial neural network is being trained.

In an embodiment, a SGD (Stochastic Gradient Descent) algorithm may be used as the optimizer. Alternatively, a NAG (Nesterov Accelerated Gradient) algorithm, a momentum algorithm, a Nadam algorithm, an Adagrad algorithm, an RMSProp algorithm, an Adadelta algorithm, an Adam algorithm, or the like may be used.

The battery service server 30 may periodically repeatedly train the artificial neural network 100 by using the data stored in the diagnostic analysis data storage unit 62 of the database 60.

To this end, by using the method described above, the battery service server 30 may collect the diagnostic analysis data from the electric vehicle control device 52 of numerous electric vehicles 50 and accumulatively record the data in the database 60.

The training data of the artificial neural network 100 includes training input data and training output data. The training input data may include frequency distribution data generated from the driving characteristic accumulative information of the electric vehicle 50, frequency distribution data generated from the operation characteristic accumulative information of the battery 51, and operation characteristic information. In addition, the training output data includes the degree of degradation of the battery 51 determined using the operation characteristic profile. Various methods for determining the degree of degradation from the operation characteristic profile have already been described.

Preferably, the diagnostic analysis data to be used for training may be recorded in the diagnostic analysis data storage unit 62 of the database 60 to be matched with the model code of the electric vehicle 50 and/or the identification code of the electric vehicle 50 and/or the model code of the battery 51 and/or the identification code of the battery 51. Therefore, in the diagnostic analysis data storage unit 62, numerous training data collected from electric vehicles 50 of the same model equipped with batteries 51 of the same model may be recorded. In addition, since the training data is continuously collected through the electric vehicle control device 52, the amount of the training data may be increased more and more.

Preferably, the battery service server 30 may train the artificial neural network separately for each model of the electric vehicles 50 and/or each model of the batteries 51 in order to reduce the training computational load of the artificial neural network 100 and improve the reliability of the output estimated by the artificial neural network 100 through distributed processing of data.

That is, when the battery service server 30 periodically trains the artificial neural network 100, among the training data stored in the diagnostic analysis data storage unit 62, the battery service server 30 may extract training data for the electric vehicles 50 of the same model and/or the batteries 51 of the same model, and independently train the artificial neural network 100 dedicated to the corresponding model of the electric vehicle 50 and/or the corresponding model of the battery 51. In addition, if the amount of training data newly collected for the model of the electric vehicle 50 and/or the model of the battery 51 increases over a reference value, the battery service server 30 may restart training the corresponding artificial neural network 100 to further improve the accuracy of the artificial neural network 100.

Meanwhile, if the frequency distribution data (see FIG. 7) generated from the driving accumulative time information of each driving area in the driving characteristic accumulative information of the electric vehicle 50 has too many variables, the artificial neural network 100 may be trained separately for each wide area that groups a plurality of areas.

For example, it is assumed that the number of models of the electric vehicles 50 is 100 in total, the number of models of the batteries 51 mounted to the electric vehicles 50 is 10 in total, and the electric vehicles 50 are running in 1,000 cities in the inside or the outside of the country. In this case, the battery service server 30 may group cities according to a predetermined criterion, and train a number of artificial neural networks corresponding to 100*10*(the number of area groups). In an example, the cities may be grouped on a country-by-country basis. In another example, the cities may be grouped in the unit of a predetermined number of neighboring cities within the same country.

In this case, when the battery service server 30 trains the artificial neural network 100, the battery service server 30 may extract only training data with the same model of the battery 51 and/or the same model of the electric vehicle 50 and with the same variable (cities) of the frequency distribution data for the driving area from the training data stored in the diagnostic analysis data storage unit 62, and independently train the artificial neural networks 100 dedicated to the driving area and/or the model of the electric vehicle 50 and/or the model of the battery 51. In addition, if the amount of new training data with the same driving area and/or the same model of the electric vehicle 50 and/or the same model of the battery 51 increases over a reference value, the battery service server 30 may restart training the corresponding artificial neural networks 100 to further improve the accuracy of the artificial neural networks 100.

In the present disclosure, the artificial intelligence model is not limited to the artificial neural network. Therefore, in addition to the artificial neural network, a Gaussian process model or the like may be used. When training the classification model for the degradation information of the battery, a SVM (Support Vector Machine), K-Nearest Neighbor Algorithm, Naive-Bayes Classifier, or the like may be used. If there is a problem with the reliability of degradation information used for training the artificial intelligence model, K-Means Clustering or the like may be used as an auxiliary means for obtaining degradation training information.

Software related to the artificial intelligence algorithm is widely known, and many software products have already been commercialized. Since the artificial intelligence algorithm is not dependent on the type of training data, it will be apparent to those skilled in the art that, in carrying out the present disclosure, it is necessary to select an optimal one as an artificial intelligence software to learn the correlation between the diagnostic analysis data and the degree of degradation among artificial intelligence algorithms known in the art.

Meanwhile, the battery service server 30 may include an auxiliary artificial neural network trained by using the operation characteristic accumulative information of each cycle and the operation characteristic profile information of each cycle provided from a battery manufacturer.

FIG. 10 is a diagram exemplarily showing a structure of an auxiliary artificial neural network 100' according to an embodiment of the present disclosure.

Referring to FIG. 10, the auxiliary artificial neural network 100' includes an input layer 101', a plurality of hidden layers 102' and an output layer 103'. The auxiliary artificial neural network 100' is substantially identical to the artificial neural network 100 shown in FIG. 9, except that the input layer 101' has no node to which data corresponding to the driving characteristic accumulative information of the electric vehicle 50 is input. The auxiliary artificial neural network 100' may be used to determine the degree of degradation of the battery 51 when the artificial neural network 100 is not sufficiently trained.

The battery service server 30 may be communicatively connected to the battery data providing server 70 through the network 40 to collect data used for training the auxiliary artificial neural network 100'.

Preferably, the battery data providing server 70 may be installed in the battery manufacturer. The battery data providing server 70 transmit the operation characteristic accumulative information of each cycle, the operation characteristic profile information of each cycle and the degree of degradation of the battery 51 of each cycle, obtained from the charging/discharging cycle experiment on the battery 51 mounted to the electric vehicle 50, to the battery service server 30 through the network 40 together with the model code and the identification code of the battery 51.

The charging/discharging cycle experiment is an experiment in which the battery 51 is charged and discharged repeatedly a predetermined number of times under various charging/discharging conditions using a device called a charging/discharging simulator. The charging/discharging cycle experiment is an essential experiment conducted by battery manufacturers before the battery 51 is commercialized. It is desirable that the charging/discharging conditions simulate various driving conditions (mountain driving, rough road driving, city driving, driving at high speed, etc.) of the electric vehicle 50 and various climatic conditions (temperature, humidity, etc.).

The charging/discharging simulator is an automated experiment equipment in which a control computer, a charging/discharging device and a temperature/humidity control chamber are combined. Whenever charging/discharging of each cycle is performed, the charging/discharging simulator may generate operation characteristic accumulative information by accumulating accumulative operation time of each voltage section and/or accumulative operation time of each current section and/or accumulative operation time of each temperature section, measure or estimate SOC and/or voltage and/or current and/or temperature to generate operation characteristic profile information while charging is in progress, and record the operation characteristic profile information in the storage means.

In addition, if the charging of each cycle is completed, the charging/discharging simulator may determine the degree of degradation of the battery 51 based on a charging completion time point. The degree of degradation may be calculated from the charge capacity change amount determined by the ampere counting method in a predetermined charging voltage section or the internal resistance of the battery obtained through linear regression analysis of the voltage and current data measured in a predetermined charging voltage section, as being already described above.

The battery data providing server 70 may include a database 71 that stores data obtained through the charging/discharging cycle experiment. Whenever each charging/discharging cycle progresses for the battery 51, the battery data providing server 70 may store the operation characteristic accumulative information of each cycle, the operation characteristic profile information of each cycle, and the degree of degradation of each cycle in the database 71 to be matched with the model code and/or the identification code of the battery 51.

The battery data providing server 70 may periodically transmit auxiliary training data including the operation characteristic accumulative information of each cycle, the operation characteristic profile information of each cycle and the degree of degradation of each cycle stored in the database 71 to the battery service server 30 through the network 40 along with the model code and/or the identification code of the battery 51. The number of auxiliary training data corresponds to the number of charging/discharging cycle experiments. For example, if the charging/discharging cycle experiment for a battery of a specific model is performed 200 times, the number of auxiliary training data is 200.

The battery service server 30 may record the auxiliary training data transmitted from the battery data providing server 70 in the diagnostic analysis data storage unit 62 of the database 60 to be matched with the identification code and/or the model code of the battery 51.

Preferably, in the auxiliary training data, the information about the accumulative operation time of each voltage section and/or the accumulative operation time of each current section and/or the accumulative operation time of each temperature section included in the operation characteristic accumulative information may be converted into frequency distribution data and stored in the diagnostic analysis data storage unit 62 of the database 60.

After the auxiliary training data is stored in the database 60, the battery service server 30 may train the auxiliary artificial neural network 100' for each battery model by using the auxiliary training data.

The structure of the auxiliary artificial neural network 100' is similar to that of the artificial neural network 100 shown in FIG. 9, but is different in that the node to which the frequency distribution data generated from the driving characteristic accumulative information of the electric vehicle 50 is input is deactivated. However, the training method and other features of the auxiliary artificial neural network 100' are substantially the same as described above.

By complementarily using the auxiliary artificial neural network 100' trained by the auxiliary training data transmitted from the battery data providing server 70 and the artificial neural network 100 trained by the training data transmitted from the plurality of electric vehicle control devices 52, the battery service server 30 may determine the degree of degradation of the battery 51, and provide a control factor used to control the charging/discharging of the battery 51 according to the determined the degree of degradation to the electric vehicle control device 52 of the electric vehicle 50.

In one example, the weighted average of the degree of degradation determined through the artificial neural network 100 and the degree of degradation determined through the auxiliary artificial neural network 100' may be determined as the degree of degradation of the battery 51. The weight given to each degree of degradation may be adaptively adjusted according to the training level of the artificial neural network 100. Preferably, as the training amount of the artificial neural network 100 increases, the weight for the degree of degradation determined through the artificial neural network 100 may be proportionally increased.

Preferably, when the degree of degradation of the battery 51 increases by more than a threshold, for example when the SOH is lowered by more than a threshold, the battery service server 30 may transmit update information of the charging/discharging control logic to the communication device 20 through the network 40.

The update information of the charging/discharging control logic corresponding to the degree of degradation may be defined in advance for each model of the electric vehicle 50 and/or each battery model and recorded in the database 60.

Preferably, when the communication device 20 receives the update information about the charging/discharging control logic from the battery service server 30, the communication device 20 transmits the update information of the charging/discharging control logic to the electric vehicle control device 52 of the electric vehicle 50. Then, the electric vehicle control device 52 may update factors referenced by the existing control logic with reference to the update information of the charging/discharging control logic.

In the present disclosure, the update information of the charging/discharging control logic may include at least one selected from a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map for each SOC and an internal resistance map for each SOC.

Optionally, when the battery 51 is pulse-charged/discharged, the update information of the charging/discharging control logic may include at least one selected from an upper limit of a pulse current duty ratio, a lower limit of the pulse current duty ratio, an upper limit of a pulse current duration, a lower limit of the pulse current duration, a maximum value of the pulse current, and a minimum value of the pulse current.

Optionally, when the battery 51 is step-charged, the update information of the charging/discharging control logic may include information about the magnitude of the charging current applied for each SOC section.

Optionally, when the battery 51 is charged in a CC (Constant-Current)/CV (Constant-Voltage) mode, the update information of the charging/discharging control logic may include at least one selected from a current magnitude in a constant-current charging (CC) mode, a cutoff voltage at which the constant-current charging (CC) mode ends, and a voltage magnitude in a constant-voltage charging (CV) mode.

According to still another embodiment, the battery service server 30 may receive the identification code of the battery 51 mounted to the electric vehicle 50 and utilization application information related to the battery performance management service through a user interface provided through the electric vehicle control device 52.

Here, the battery performance management service means a service in that the electric vehicle control device 52 transmits the diagnostic analysis data of the battery 51 to the battery service server 30 and receives the update information about the control logic of the battery 51 from the battery service server 30 regularly or irregularly.

The user interface is a graphic user interface and may be provided through an integrated information display 53 of the electric vehicle 50. The integrated information display 53 is provided aside the driver's seat in the electric vehicle 50, and is a computer display that manages the control of the electric vehicle 50 and displays various driving information of the electric vehicle 50. The electric vehicle control device 52 may provide various user interfaces necessary for implementing the present disclosure through the integrated information display 53.

In the present disclosure, the battery performance management service may be provided free of charge or for a fee.

When the utilization application information about the battery performance management service is received through the network 40, the battery service server 30 may be configured to determine the degree of degradation by using an ampere counting method, linear regression analysis for voltage/current data, an extended Kalman filter or a pre-trained artificial intelligence model whenever the diagnostic analysis data for the battery 51 is collected, determine whether it is necessary to update the charging/discharging control logic, and generate update information on the charging/discharging control logic and provide the same to the electric vehicle control device 52 if update is required.

To this end, the battery service server 30 may set and store a service use flag for the battery 51 for which the battery performance management service is applied in the battery identification information storage unit 61. That is, for a battery for which the battery performance management service is applied, the service use flag may be set through searching for the battery identification code.

Optionally, the battery service server 30 may be configured to further receive payment information in the step of receiving the utilization application information for the battery performance management service, and to charge for the generation and provision of the update information of the charging/discharging control logic.

A fee may be charged in any form, such as regular charging or charging for a specific period (month, quarter, year, etc.). The billing method may be a credit card, electronic money, virtual currency (Bitcoin, Ethereum), and the like. The battery service server 30 may record charging information for the battery performance management service in the charging information storage unit 68 together with the identification code (ID) of the user and/or the battery identification code of the electric vehicle 50. The charging information may include the identification code (ID) of the user of the electric vehicle 50, the battery identification code, payment cycle, payment amount, payment term, payment method information, payment date and time, and charging success flag.

Meanwhile, the application for battery performance management service is also possible on the user interface output from the mobile communication terminal 90 owned by the user of the electric vehicle 50 without using the electric vehicle control device 52.

Preferably, the mobile communication terminal 90 is a smart phone, and the user interface is a graphic user interface provided by an application. The battery service server 30 may distribute an application that may run in the mobile communication terminal 90, and the user may download the corresponding application through the network 40 and install the same in the mobile communication terminal 90 owned by the user. Hereinafter, the application installed at the mobile communication terminal 90 is called battery management software.

The user may apply for the battery performance management service after running the battery management software in the mobile communication terminal 90. At this time, it is obvious that the user may input payment information.

According to still another embodiment, the battery service server 30 may further provide other additional services along with the battery performance management service. Additional services may be provided as paid or free services.

In one example, the battery service server 30 may calculate the remaining life of the battery 51 by referring to the degradation information on the battery 51 and output the same graphically through the battery management software. Of course, the information about the remaining life may be output from the integrated information display 53 of the electric vehicle 50 through the electric vehicle control device 52. The remaining life may be calculated by referring to a look-up table that defines the remaining life for each degree of degradation. The remaining life look-up table may be defined for each model of the electric vehicle 50 and/or each battery model and recorded in advance in the battery residual value storage unit 65 of the database 60.

In addition, the battery service server 30 may calculate the residual value of the battery corresponding to the degree of degradation of the battery 51 by referring to the residual value look-up table that defines the residual value according to the degree of degradation of the battery 51 and output the same graphically through the battery management software. The residual value means a relative value based on the market price of the battery. The residual value may be expressed as a percentage based on the market price of the battery. Information about the residual value may be output from the integrated information display 53 of the electric vehicle 50 through the electric vehicle control device 52. The residual value look-up table may be defined in advance for each model of the electric vehicle 50 and/or each battery model and recorded in the battery residual value storage unit 65 of the database 60.

In addition, the battery service server 30 may analyze the driving information of the electric vehicle 50, calculate the remaining life of the battery under the condition that the user's current driving habit is maintained, and transmit the same to the electric vehicle control device 52 through the network 40. Then, the electric vehicle control device 52 may display the remaining life information of the battery through the integrated information display 53 of the electric vehicle 50. In another example, the battery service server 30 may transmit the remaining life of the battery to the battery management software running in the mobile communication terminal 90. Then, the battery management software may output the remaining life information through the display of the mobile communication terminal 90.

The driving habit may be analyzed using the speed change profile according to the SOC included in the diagnostic analysis data collected from the electric vehicle 50. As an example, the battery service server 50 may accumulatively count the number of sudden accelerations by analyzing the speed change profile according to the SOC, and classify the driving habit into a plurality of types according to the number of sudden accelerations. Sudden acceleration is determined based on the case where a speed change compared to the SOC change is greater by a critical value or above.

The battery service server 30 may define the increase speed of the degree of degradation according to the type of driving habit in advance. That is, the battery service server 30 analyzes the driving information of the electric vehicle 50 recorded in the diagnostic analysis data storage unit 62 of the database 60 to calculate the number of accumulative sudden accelerations, determines the type of the driving habit of the user of the electric vehicle 50 among a plurality of driving habit types, and determine the increase speed of a predefined degree of degradation corresponding to the type of the driving habit. Then, the battery service server 30 may determine the time taken for the degree of degradation to increase by more than the threshold by increasing the degree of degradation (that is, by reducing SOH) according to the increase speed of the degree of degradation determined according to the type of driving habit based on the current degree of degradation of the battery 51 as the remaining life of the battery. In addition, the battery service server 30 may determine the remaining life of the battery according to all driving habit types and transmit the same to the electric vehicle control device 52 or the battery management software operating in the mobile communication terminal 90. Then, the electric vehicle control device 52 may display the remaining life information of the battery 51 estimated for each type of driving habit through the integrated information display 53 of the electric vehicle 50. In addition, the battery management software may display the remaining life information of the battery 51 estimated for each type of driving habit through the display of the mobile communication terminal 90. The user of the electric vehicle 50 may be provided with the remaining life information of the battery 51 estimated from the current driving habit as well as the remaining life information of the battery 51 estimated from other driving habit types. Accordingly, it is possible to induce the user of the electric vehicle 50 to drive more economically. The increase speed of the degree of degradation according to the type of driving habit may be defined in advance for each battery model and recorded in the database 60.

According to still another embodiment, the battery 51 included in the electric vehicle 50 may be rented. In this case, a rental charging server operated by a battery rental company may be connected to the battery service server 30 to enable communication through the network 40 as an embodiment of the external server 80.

In this embodiment, the external server 80 (the rental charging server) may receive a battery rental service application from the user of the electric vehicle 50 through the network 40.

The battery rental service application is possible through the user interface provided by the electric vehicle control device 52 through the integrated information display 53 of the electric vehicle 50 or the user interface provided by the battery management software operating in the mobile communication terminal 90.

The rental service application information may include the user identification code (ID) of the electric vehicle 50, the model codes of the electric vehicle 50 and the battery 51, the identification codes of the electric vehicle 50 and the battery 51, rental time of the battery 51, rental usage fee, payment information, etc.

The battery rental service application may be proceeded at the purchase stage of the electric vehicle 50, and may also be proceeded when the battery of the electric vehicle 50 is replaced. Of course, regarding the battery rental service application, it is also possible to convert the usage type of the battery 51 to rental while the electric vehicle 50 is being used. In this case, the regular usage fee according to the rental of the battery 51 may be deducted from the battery price paid at the time of purchasing a new car, and when the rental usage time is over, the cost corresponding to the residual value of the battery may be refunded to the user of the electric vehicle 50 or be paid as an initial deposit when renting a new battery.

The external server 80 (the rental charging server) transmits a battery identification code for the rental service application to the battery service server 30 through network 40. When a rental service is applied for the first time, the external server 80 (the rental charging server) may transmit the battery model code, the electric vehicle identification code, the payment information, etc. together with the battery identification code to the battery service server 30. Then, the battery service server 30 records the battery identification code for applying the rental service and the like in the battery identification information storage unit 61 of the database 60 and sets a rental flag indicating the rental status at the same time. If the battery identification code is already registered in the database 60, only the step of setting the rental flag may be performed. It is obvious that various information including the payment information received while applying the battery rental service may be recorded in the database 60 and maintained and updated.

If the battery 51 mounted to the electric vehicle 50 is a rental battery, the battery service server 30 may additionally collect information about the accumulative charging/discharging amount of the battery along with the diagnostic analysis data of the battery 51 from the electric vehicle control device 52 and record the same in the accumulative charging/discharging amount storage unit 63 of the database 60.

In addition, the battery service server 30 may calculate the usage fee of the battery 51 according to the accumulative charging/discharging amount and the degradation change amount of the battery 51 included in the electric vehicle 50, and transmit the same to the electric vehicle control device 52 or the battery management software operating in the mobile communication terminal 90 of the user. Then, the electric vehicle control device 52 may display the information about the usage fee of the battery 51 through the integrated information display 53 of the electric vehicle 50. In addition, the battery management software may display the information about the usage fee of the battery 51 through the display of the mobile communication terminal 90.

The usage fee of the rental battery may be determined by multiplying the cost per 1 Kw by the accumulative charging/discharging amount corresponding to the charging period to primarily calculate a usage fee, and then adding an additional cost according to the increase of the degree of degradation during the charging period to the primarily calculated cost. The additional cost according to the increase of the degree of degradation may be preset for each battery model. The additional cost is put into consideration because, as the degree of degradation increases (i.e., as SOH decreases), the residual value of the battery decreases according to the depreciation.

The battery service server 30 may determine the usage fee for the battery 51 on a regular basis, for example, on the last day of each month, and then record the battery usage fee information for the corresponding month in the battery usage fee storage unit 66 of the database 60 together with the battery identification code of each battery 51 for which rental service is applied.

The external server 80 (the rental charging server) of the battery rental company may periodically access the battery service server 30 through the network 40 to receive the usage fee information for the battery 51 for which the rental service is applied, and then send a payment request message to the electric vehicle control device 52 of the electric vehicle 50 or the battery management software of the mobile communication terminal 90. Then, the electric vehicle control device 52 may request payment to the user by outputting a payment request screen through the integrated information display 53 of the electric vehicle 50. Similarly, the battery management software may request payment to the user by outputting a payment request screen through the display of the mobile communication terminal 90. The usage fee for the battery 51 may be paid by any payment methods known in the art, such as credit card payment, account transfer payment, electronic money payment, and virtual currency payment. If the user has registered payment method information in advance, the payment related to the usage fee may be automatically processed.

In addition, when the user completes the payment, the external server 80 (the rental charging server) transmits a payment completion flag to the battery service server 30 through the network 40. Then, the battery service server 30 initializes the usage fee for the battery 51 for which the usage fee payment is completed to 0.

According to still another embodiment, an insurance company server of an insurance company may access the battery service server 30 as another embodiment of the external server 80.

The external server 80 (the insurance company server) is a server that the user of the electric vehicle 50 accesses when the user wants to purchase insurance for the electric vehicle 50. The external server 80 (the insurance company server) may be accessed through the user interface provided by the electric vehicle control device 52 through the integrated information display 53 of the electric vehicle 50 or through the user interface of the battery management software operating in the mobile communication terminal 90. In addition, the external server 80 (the insurance company server) may be accessed by the user of the electric vehicle 50 using a browser installed on a computer or the mobile communication terminal 90.

The external server 80 (the insurance company server) may receive an electric vehicle identification code (a vehicle identification number) together when receiving an insurance subscription application from the user of the electric vehicle 50. Then, the external server 80 (the insurance company server) transmits the electric vehicle identification code to the battery service server 30 through the network 40. Then, the battery service server 30 may read the battery identification code stored to be matched with the electric vehicle identification code by referring to the battery identification information storage unit 61 of the database 60, and map the residual value matched with the battery identification code in the battery residual value storage unit 65 of the database 60, and transmit the mapped battery residual value information to the external server 80 (the insurance company server) through the network 40.

The battery service server 30 may charge the external server 80 (the insurance company server) for inquiring the battery residual value information. Accordingly, the battery service server 30 may be configured to store an identification code of the insurance company that has requested the battery residual value information and the charging information for the provision of the residual value information in the charging information storage unit 68 of the database 60.

The external server 80 (the insurance company server) calculates the residual value of the electric vehicle 50 except for the battery 51 after receiving the information about the battery residual value from the battery service server 30. The residual value of the electric vehicle 50 may be determined by considering the degree of aging and the period of use. In addition, the external server 80 (the insurance company server) may calculate the total price of the electric vehicle 50 by adding the battery residual value and the residual value of the electric vehicle 50, calculate a property compensation insurance premium from the calculated price, and transmit the same to the electric vehicle control device 52 of the electric vehicle 50 or the battery management software operating in the mobile communication terminal 90 through the network 40. Then, the electric vehicle control device 52 may display the information about the property compensation insurance premium through the integrated information display 53 of the electric vehicle 50. In addition, the battery management software may display the information about the property compensation insurance premium through the display of the mobile communication terminal 90.

The user may transmit car insurance subscription application information to the external server 80 (the insurance company server) after checking the information about insurance premium displayed through the integrated information display 53 of the electric vehicle 50 or the display of the mobile communication terminal 90.

The subscription application information may include the vehicle number of the electric vehicle 50, the model and production year of the electric vehicle 50, user name, resident number, address, contact information (phone number, e-mail, etc.), payment means, payment information, and the like.

In some cases, the external server 80 (the insurance company server) may provide a discount event for insurance premiums on the premise of subscribing to the battery performance management service provided by the battery service server 30 when the user of the electric vehicle 50 wants to purchase car insurance.

According to still another embodiment, an electronic commerce server of a used electric vehicle trading company may access the battery service server 30 through the network 40 as another embodiment of the external server 80. The external server 80 (the electronic commerce server) may receive the electric vehicle identification code (the vehicle identification number) from the user while the user of the electric vehicle 50 is registering the electric vehicle 50 as a sale item. The external server 80 (the electronic commerce server) may be accessed by using the user interface provided by the electric vehicle control device 52 through the integrated information display 53 of the electric vehicle 50 or by using the battery management software operating in the mobile communication terminal 90. In addition, the external server 80 (the electronic commerce server) may be accessed by the user of the electric vehicle 50 using a browser installed in a computer or the mobile communication terminal 90.

The external server 80 (the electronic commerce server) may receive the electric vehicle identification code (the vehicle identification number) together when receiving a sales application for the electric vehicle 50 from the user of the electric vehicle 50. Then, the external server 80 (the electronic commerce server) sends the electric vehicle identification code to the battery service server 30 through the network 40. Then, the battery service server 30 may read the stored battery identification code stored to be matched with the electric vehicle identification code by referring to the battery identification information storage unit 61 of the database 60, map the residual value matched with the battery identification code in the battery residual value storage unit 65 of the database 60, and transmit the mapped battery residual value information to the external server 80 (the electronic commerce server) through the network 40.

The battery service server 30 may charge the external server 80 (the electronic commerce server) for inquiring the battery residual value information. Accordingly, the battery service server 30 may be configured to store an identification code of the electronic commerce company that has requested the battery residual value information and the charging information for the provision of the residual value information in the charging information storage unit 68 of the database 60.

After receiving the information about the battery residual value from the battery service server 30, the external server 80 (the electronic commerce server) calculates a residual value of the electric vehicle 50 according to the usage period of the electric vehicle 50. In addition, the external server 80 (the electronic commerce server) calculates the used price of the electric vehicle 50 by adding the battery residual value and the residual value of the electric vehicle 50, and transmits the corresponding used price to the electric vehicle control device 52 of the electric vehicle 50 or the battery management software operating in the mobile communication terminal 90 as recommended selling price information of the electric vehicle 50. Then, the electric vehicle control device 52 may output the recommended selling price information of the electric vehicle 50 through the integrated information display 53 of the electric vehicle 50. In addition, the battery management software may output the recommended selling price information of the electric vehicle 50 through the display of the mobile communication terminal 90.

After checking the recommended selling price information of the electric vehicle 50, the user may transmit used sales application information of the electric vehicle 50 to the external server 80 (the electronic commerce server) through the network 40. The used sales application may be made through the user interface provided by the electric vehicle control device 52 through the integrated information display 53 of the electric vehicle 50. In addition, the used sales application may be made through the user interface provided by the battery management software through the display of the mobile communication terminal 90. In addition, the used sales application may be made through a web page provided by the external server 80 (the electronic commerce server) or a dedicated mobile application provided by the external server 80 (the electronic commerce server).

The used sales application information may include the vehicle number of the electric vehicle 50, the model and production year of the electric vehicle 50, the identification information (ID) of the user, the contact information (phone number, e-mail, etc.), the sales price of the electric vehicle 50, and the like.

In some cases, the external server 80 (the electronic commerce server) may access the battery service server 30 when the user of the electric vehicle 50 applies for sales of the electric vehicle 50 to inquire whether the battery of the electric vehicle 50 applied for sale is subscribed to the performance management service and inquire the subscription period, and increase the price of the electric vehicle 50 according to a predetermined rate.

According to still another embodiment, a warranty certification server of a battery guaranteeing company may access the battery service server 30 as another embodiment of the external server 80. The warranty certification server may be provided to the battery guaranteeing company. The external server 80 (the warranty certification server) is a server accessed by a computer of a warranty certification requester in the process of certificating whether the battery 51 mounted to the electric vehicle 50 is guaranteed by the manufacturer during the maintenance process of the electric vehicle 50 or the like.

The external server 80 (the warranty certification server) may receive the electric vehicle identification code or the battery identification code printed on the surface of the battery 51 from a terminal of the warranty certification requester that intends to check whether the performance management of the battery mounted to the electric vehicle 50 (that is, the update of the charging/discharging control logic based on the diagnosis of the degree of degradation of the battery) is continuously performed. The certification requester may be a mechanic of the electric vehicle 50, or the like. The external server 80 (the warranty certification server) receives the electric vehicle identification code or the battery identification code through the network 40 from the terminal of the warranty certification requester.

The external server 80 (the warranty certification server) transmits the electric vehicle identification code or the battery identification code to the battery service server 30 through the network 40. Then, the battery service server 30 identifies whether the warranty flag is set for the battery corresponding to the electric vehicle identification code or the battery identification code by referring to the warranty flag storage unit 68 of the database 60. If the warranty flag is set, the battery service server 30 may send a warranty certification success message to the external server 80 (the warranty certification server) through the network 40. Accordingly, the warranty certification requester may confirm that the battery 51 is a battery whose electrochemical performance and remaining life are guaranteed as the performance management of the battery 51 mounted to the electric vehicle 50 is continuously managed for a predetermined time.

In still another embodiment, an advertisement server of an advertisement company may access the battery service server 30 as another embodiment of the external server 80. The external server 80 (the advertisement server) receives target advertisement information according to location from an advertiser computer and transmits the same to the battery service server 30 through the network 40. The target advertisement may preferably be a video advertisement. Then, the battery service server 30 stores the target advertisement information in the database 60 to be matched with the location coordinate. In addition, the battery service server 30 may further collect moving path information of the electric vehicle 50 when collecting the diagnostic analysis data from the electric vehicle control device 52 of the electric vehicle 50. In this case, the battery service server 30 inquires whether the target advertisement information corresponding to the location coordinate of the moving path of the electric vehicle 50 or its adjacent place is recorded in the database 60. If the target advertisement information is recorded, the battery service server 30 reads the target advertisement information from the database 60 and transmits the same to the electric vehicle control device 52 or the battery management software of the mobile communication terminal 90 through the network 40. Then, the electric vehicle control device 52 may output the target advertisement (video) through the integrated information display 53 of the electric vehicle 50. In addition, the battery management software may output the target advertisement (video) through the display of the mobile communication terminal 90. The target advertisement is preferably output while the electric vehicle 50 is being charged at a charging station or while the electric vehicle 50 is stationary. As a result, it is possible to provide a target advertisement matched with the moving path of the electric vehicle 50 to the user of the electric vehicle 50, thereby maximizing the effect of the target advertisement.

According to the present disclosure, it is possible to reliably evaluate the battery performance of an electric vehicle and to optimize the charging/discharging control logic of the battery to be matched with the performance of the battery, thereby not only extending the service life of the battery but also improving the safety of the battery use.

In addition, by providing reliable information on the remaining life of the battery to the user of the electric vehicle, it is possible to induce replacement of the battery at an appropriate time, and also to enhance the reliability of a battery manufacturer.

In addition, by building a database on correlation data between driving habits of an electric vehicle user and a remaining battery life, the database may be used as accurate data for insurance premium calculation of automobile insurance companies.

In addition, by providing a method to reasonably determine the residual value of the electric vehicle battery, it is possible to activate the electric vehicle insurance market and the used car trading market.

In addition, by providing a meter-rate billing service that allows the battery mounted to the electric vehicle to be used in a rental manner, it is possible to reduce the burden of purchasing an electric vehicle and consequently to promote rapid expansion of the electric vehicle market.

In addition, by providing a performance guarantee service (warranty service) for a battery that has undergone performance management on a regular basis, it is possible to guarantee reliability of performance when distributing an electric vehicle equipped with the corresponding battery or when the corresponding battery is reused.

In addition, by exposing target advertisement information matched with the moving path of the electric vehicle to the user of the electric vehicle, it is possible to maximize the advertisement effect.

In the description of the various exemplary embodiments of the present disclosure, it should be understood that the element referred to as 'server' is distinguished functionally rather than physically. Therefore, each element may be selectively integrated with other elements or each element may be divided into sub-elements for effective implementation control logic (s). However, it is obvious to those skilled in the art that, if functional identity can be acknowledged for the integrated or divided elements, the integrated or divided elements fall within the scope of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery service providing system, comprising:
a computer included inside an electric vehicle and configured to collect and manage operation characteristic information of a battery mounted to an electric vehicle and driving characteristic information of the electric vehicle, wherein the operation characteristic information includes measurements of one or more properties of the battery collected while the battery is being charged or discharged, and wherein the driving characteristic information is indicative of driving habits of a driver of the electric vehicle;
a battery service server communicatively connected to the computer through a network; and
a database connected to the battery service server so as to be accessed by the battery service server,
wherein the battery service server is configured to:
collect diagnostic analysis data through the network and store the diagnostic analysis data in the database, wherein the diagnostic analysis data includes the operation characteristic information of the battery and the driving characteristic information of the electric vehicle and operation characteristic information and driving characteristic information of a plurality of other electric vehicles sorted according to one or more grouping characteristics, wherein the one or more grouping characteristics include at least one of: model codes of at least one of the electric vehicles; identification codes of the electric vehicles, model codes of batteries included in the electric vehicles, or identification codes of the batteries included in the electric vehicles;
train a plurality of models using the diagnostic analysis data, wherein each model is associated with a different respective set of grouping characteristics, and wherein each model is trained using the diagnostic analysis data from vehicles of the set of grouping characteristics associated with the model;
determine a degree of degradation of the battery of the electric vehicle based on the model associated with the set of grouping characteristics to which the electric vehicle belongs; and
generate update information of a charging/discharging control logic of the battery according to the determined degree of degradation and provide the update information to the computer.

2. The battery service providing system according to claim 1,
wherein the database includes a data area in which voltage profile information defined for each battery model and each degree of degradation is stored, and
the battery service server is configured to identify a voltage profile with highest similarity to a voltage profile included in the diagnostic analysis data by referring to the voltage profile information of each degree of degradation corresponding to a battery model for which the diagnostic analysis data is collected, determine a degree of degradation corresponding to the identified voltage profile as a degree of degradation of the battery, and store the determined degree of degradation in the database.

3. The battery service providing system according to claim 1,
wherein the update information of the charging/discharging control logic includes:
at least one selected from a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map of each SOC, and an internal resistance map of each SOC;
at least one selected from an upper limit of a pulse current duty ratio, a lower limit of the pulse current duty ratio, an upper limit of a pulse current duration, a lower limit of the pulse current duration, a maximum value of a pulse current, and a minimum value of the pulse current, in the case where the battery is pulse-charged/discharged;
a charging current magnitude applied for each SOC section, in the case where the battery is step-charged; or
at least one selected from a current magnitude in a constant-current charging (CC) mode, a cutoff voltage at which the CC mode ends, and a voltage magnitude in a constant-voltage charging (CV) mode.

4. The battery service providing system according to claim 1,
wherein the battery service server is configured to determine the degree of degradation of the battery by analyzing the diagnostic analysis data collected from the computer in real time, and store the determined degree of degradation in the database to be matched with the battery identification code.

5. The battery service providing system according to claim 1,
wherein the battery service server is configured to:
receive an identification code of the battery mounted to the electric vehicle and utilization application information for battery performance management service through a user interface provided by the computer through an integrated information display of the electric vehicle or a mobile communication terminal of a user; and
generate update information of the charging/discharging control logic for a battery for which the utilization application information is received, and provide the update information to the computer.

6. The battery service providing system according to claim 5,
wherein the battery service server is configured to further receive payment information when receiving the utilization application information, and charge for the generation and provision of the update information of the charging/discharging control logic.

7. The battery service providing system according to claim 1,
wherein the battery service server is configured to calculate a residual value of the battery corresponding to the determined degree of degradation by referring to a residual value look-up table defining a residual value according to the degree of degradation of the battery, and provide the calculated residual value through an integrated information display of the electric vehicle coupled with the computer or a display of a mobile communication terminal of a user of the electric vehicle.

8. The battery service providing system according to claim 7, wherein the battery service server is configured to transmit the residual value of the battery to an external server according to a request of the external server.

9. The battery service providing system according to claim 1,
wherein the battery service server is configured to further receive an accumulative charging/discharging amount of the battery from the computer together with the diagnostic analysis data, calculate a usage fee of the battery according to the accumulative charging/discharging amount and the degree of degradation, and provide the calculated usage fee through an integrated information display of the electric vehicle coupled with the computer or a display of a mobile communication terminal of a user.

10. The battery service providing system according to claim 9, wherein the battery service server is configured to transmit the usage fee value of the battery to an external server according to a request of the external server.

11. The battery service providing system according to claim 1,
wherein the external server is an insurance company server of an insurance company, and
the battery service server is configured to receive a battery identification code from the insurance company server through the network, determine residual value information of the battery corresponding to the received battery identification code by referring to the database, and provide the determined residual value information of the battery to the insurance company server.

12. The battery service providing system according to claim 1,
wherein the external server is an electronic commerce server of a used electric vehicle trading company, and
the battery service server is configured to receive a battery identification code from the electronic commerce server through the network, determine residual value information of the battery corresponding to the received battery identification code by referring to the database, and provide the determined residual value information of the battery to the electronic commerce server.

13. The battery service providing system according to claim 1,
wherein the external server is a warranty certification server of a battery guaranteeing company that requests warranty certification for the battery, and
the battery service server is configured to receive a battery identification code from the warranty certification server through the network, determine whether a warranty flag corresponding to the received battery identification code exists in the database by referring to the database, and provide a warranty certification success message to the warranty certification server when the warranty flag exists.

14. The battery service providing system according to claim 1,
wherein the battery service server is configured to:
receive target advertisement information according to a location coordinate from an advertisement server and store the received target advertisement in the database; and
further receive driving information about a moving path of the electric vehicle while receiving the diagnostic analysis data from the computer, inquire target advertisement information matched with the moving path of the electric vehicle from the database, and provide the inquired target advertisement information through an integrated information display of the electric vehicle coupled with the computer or a display of a mobile communication terminal of a user.

15. The battery service providing system according to claim 1,
wherein the battery service server is configured to collect the diagnostic analysis data from the computer through a charging station while the battery of the electric vehicle is being charged at the charging station, or collect the diagnostic analysis data from the computer while the electric vehicle is running or stationary.

16. The battery service providing system according to claim 1, wherein the driving characteristic information includes at least one of:
a speed change profile indicative of a number of sudden accelerations by the electric vehicle; and
a driving distance accumulative profile associating accumulative discharge amounts of the battery with respective driving distance amounts over a span of time.

17. The battery service providing system according to claim 1, wherein the diagnostic analysis data further includes at least one of:
humidity data associated with the operation characteristic information and the driving characteristic information, and indicating humidity of an area where the electric vehicle is driven;
driving area data associated with the operation characteristic information and the driving characteristic information, and indicating an area in which the electric vehicle is driven;
driving speed data associated with the operation characteristic information and the driving characteristic information, and indicating a speed at which the electric vehicle is driven, and
wherein the battery service server is configured to determine the degree of degradation of the battery of the electric vehicle based in part on a frequency distribution of at least one of the humidity data, driving area data, and driving speed data.

18. The battery service providing system according to claim 17, wherein the diagnostic analysis data further includes each of the humidity data, the driving area data, and the driving speed data, and wherein the battery service server is configured to determine the degree of degradation of the battery of the electric vehicle based in part on the frequency distributions of each of the humidity data, driving area data, and driving speed data.

19. A battery service providing method, comprising:
a step of collecting diagnostic analysis data including operation characteristic information of a battery and driving characteristic information of an electric vehicle from a computer through a network and storing the diagnostic analysis data in a database, wherein the operation characteristic information includes measurements of one or more properties of the battery collected while the battery is being charged or discharged, and wherein the driving characteristic information is indicative of driving habits of a driver of the electric vehicle, wherein the diagnostic analysis data further includes operation characteristic information and driving characteristic information of a plurality of other electric vehicles sorted according to one or more grouping characteristics, wherein the one or more grouping characteristics include at least one of: model codes of at least one of the electric vehicles; identification codes of the electric vehicles, model codes of batteries included in the electric vehicles, or identification codes of the batteries included in the electric vehicles;

a step of training a plurality of models using the diagnostic analysis data, wherein each model is associated with a different respective set of grouping characteristics, and wherein each model is trained using the diagnostic analysis data from vehicles of the set of grouping characteristics associated with the model;

a step of determining a degree of degradation of the battery of the electric vehicle based on the model associated with the set of grouping characteristics to which the electric vehicle belongs; and a step of generating update information of a charging/discharging control logic of the battery according to the determined degree of degradation and providing the update information to the computer.

* * * * *